United States Patent [19]

Tsuzuki et al.

[11] Patent Number: 4,959,712
[45] Date of Patent: Sep. 25, 1990

[54] METHOD AND APPARATUS FOR COLOR ADJUSTMENT

[75] Inventors: Toshiyuki Tsuzuki; Masato Toho, both of Kanagawa, Japan

[73] Assignee: Fuji Xerox Co., Ltd., Tokyo, Japan

[21] Appl. No.: 429,285

[22] Filed: Oct. 31, 1989

[30] Foreign Application Priority Data

Nov. 1, 1988 [JP] Japan ................................ 63-274542

[51] Int. Cl.$^5$ ........................ H04N 1/387; H04N 1/40; H04N 1/46
[52] U.S. Cl. .......................................... 358/80; 358/75
[58] Field of Search ...................................... 358/75, 80

[56] References Cited

U.S. PATENT DOCUMENTS

| | | | | |
|---|---|---|---|---|
| 4,789,892 | 12/1988 | Tsuzuki | ................................ | 358/80 |
| 4,819,193 | 4/1989 | Imao | ................................ | 358/80 |
| 4,884,130 | 11/1989 | Huntsman | ................................ | 358/80 |

Primary Examiner—Howard W. Britton
Attorney, Agent, or Firm—Finnegan, Henderson, Farabow, Garrett, and Dunner

[57] ABSTRACT

A method and an apparatus for color adjustment, in which color adjusting coefficients for respective colors are added to color correction signals in a coefficient matrix, in the matrix masking for the color correction and color adjustment. Further, the sum of the color adjusting coefficients in each row in the coefficient matrix is zero. By this feature a gray level in the original image can be maintained even after the color adjustments. Additionally, the chroma check is made in the color adjustment. This feature prevents the color adjustments from influencing the complementary colors. Only the intended color can be adjusted independently of other colors. Accordingly, the color adjustment is easy and does not require any professional skill.

4 Claims, 18 Drawing Sheets

ADJUSTMENT OF MAGENTA

ADJUSTMENT OF CYAN

ADJUSTMENT OF BLUE

ADJUSTMENT OF YELLOW

METHOD AND APPARATUS FOR COLOR ADJUSTMENT

BACKGROUND OF THE INVENTION

1. Field of the Invention

The present invention relates to a color image forming apparatus, and more particularly to a method and apparatus for adjusting colors of an image read from a color original.

2. Related Art Description

In the fields of color printing and color copy, for example, a color of an image on a color original is separated into three primary colors by color filters of red (R), green (G) and blue (B), to obtain color signals of red, green and blue, respectively. Color signals of yellow (Y), magenta (M), and cyan (C), and if required, black (K) are formed from those color signals. In accordance with those formed signals, color materials such as color ink and color toner are outputted on a recording paper by a color hard copy machine, such as a color laser zerography, a color thermal printer, and a color ink jet printer.

Such a color image forming apparatus is capable of correcting colors by increasing or decreasing specific color signals of those color signals resulting from the color separation process.

The color correction process comes in the following two processes:

(1) masking for making a basic color correction for removing irregular absorption of ink or toner color, and (2) masking for adjusting specific colors for correcting an abnormal color on an original image or for adjusting specific colors so as to satisfy user's tastes.

The masking (1) is used to cope with the difference of the spectral and reflecting characteristics of the color materials, such as color ink or color toner from the ideal characteristics. The masking (2) above can corrects a specific color on an original image whose saturation is lower than its normal saturation into a color of a normal saturation, by intensifying a color signal corresponding to that color. To change a specific color on the original to another color, a color signal corresponding to the specific color is weakened while a color signal corresponding to the desired color is intensified.

When the color adjustment is applied to the respective separated colors, yellow, magenta, cyan, and black, the number of the color adjustments is increased. Further, a high skill is required for a satisfactory color adjustment. In the printing field, for example, there is used a color separation scanner which separates a color on a color original and electronically forms three separated color plates. In the color separation scanner which is capable of adjusting yellow, magenta, cyan and black for six chroma of yellow, magenta, cyan, red, green, and blue, the number of color adjustments is 24. In the case of the scanner capable of adjusting light red and brown in addition to the above colors, the number of the color adjustments is further increased and is 32. Accordingly, the color adjustments becomes more difficult.

These color adjustments are extremely intricate, and requires professional skills.

SUMMARY OF THE INVENTION

Accordingly, an object of the present invention is to provide an adjustment of desired colors without professional skills by applying the color adjustment mainly to red, green, blue, yellow, magenta, and cyan of the colors on an original respectively through the color adjustments for red, green, blue, yellow, magenta, and cyan. Another object of the present invention is to keep a constant gray level during the color adjustments.

According to one aspect of the present invention, there is provided a method for adjusting colors, which is exercised in a color image forming apparatus. In the apparatus, output signals of yellow, magenta and cyan are formed from color signals of blue, green, and red that are obtained by separating an image on an original, in forming the output signals, a matrix masking is performed in which the respective color signals are multiplied by color correction coefficients in a coefficient matrix, thereby to correct irregular absorption of color materials, color adjusting coefficients are added to the correction coefficients corresponding to the respective colors in the coefficient matrix, and coefficients so as to zero the sum of the color adjusting coefficients in each row of the matrix are subtracted from the color signals, thereby to keep a gray level unchanged, and the color materials are outputted on a recording medium in accordance with the output signals. In the image forming apparatus, the method for adjusting colors comprises the steps of:

(1) adjusting a red color by obtaining a yellow signal $\Delta Y$ and a magenta signal $\Delta M$, which are for color adjustment and formed through a multiplication of the blue and green color signals B and G by a red color adjusting coefficient $\alpha_G$;

(2) adjusting a green color by obtaining a yellow signal $\Delta Y$ and a cyan signal $\Delta C$ which are for color adjustment and formed through a multiplication of the blue and red color signals B and R by a green color adjusting coefficient $\alpha G$;

(3) adjusting a blue color by obtaining a magenta signal $\Delta M$ and a cyan signal $\Delta C$ which are color adjusted through a multiplication of the green and red signals G and R by a blue color adjusting coefficient $\alpha_B$;

(4) adjusting a yellow color by obtaining a yellow signal $\Delta Y$ color adjusted through a multiplication of the blue color signal B by a yellow color adjusting coefficient $\alpha_Y$;

(5) adjusting a magenta color by obtaining a magenta signal $\Delta M$ color adjusted through a multiplication of the green color signal G by a magenta color adjusting coefficient $\alpha_M$; and (6) adjusting a cyan color by obtaining a cyan signal $\Delta C$ color adjusted through a multiplication of the red color signal R by a cyan color adjusting coefficient $\Delta_C$.

A method for adjusting colors according to another aspect of the present invention comprises the steps (1) to (6) above, and further contains the steps to intensify a color to be adjusted by weakening a color density of the complementary color of the adjusted color. Specifically, the method comprises the steps of:

(1)' adjusting a red color by obtaining a cyan signal $\Delta C$ which is for color adjustment and is obtained through a multiplication of the blue and green color signals B and G by a color adjusting coefficient $\alpha_R'$ to reduce a color density of the complementary color of red;

(2)' adjusting a green color by obtaining a magenta signal $\Delta M$ which is for color adjustment and is obtained through a multiplication of the blue and red color signals B and R by a color adjusting coefficient $\alpha_G'$ to reduce a color density of the complementary color of green;

(3)' adjusting a blue color by obtaining a yellow signal ΔY which is for color adjustment and is obtained through a multiplication of the green and red color signals G and R by a color adjusting coefficient $\alpha_B'$ to reduce a color density of the complementary color of blue;

(4)' adjusting a yellow color by obtaining a magenta signal ΔM and a cyan signal ΔC color adjusted through a multiplication of the blue color signal B by a color adjusting coefficient $\alpha_Y'$ to reduce a color density of the complementary color of yellow;

(5)' adjusting a magenta color by obtaining a yellow signal ΔY and a cyan signal ΔC color adjusted through a multiplication of the green color signal G by a color adjusting coefficient $\alpha_M'$ to reduce a color density of the complementary color of magenta; and (6)' adjusting a cyan color by obtaining a yellow signal ΔY and a magenta signal ΔM color adjusted through a multiplication of the red color signal R by a color adjusting coefficient $\alpha_C'$ to reduce a color density of the complementary color of cyan.

A color image forming apparatus for exercising the method according to one aspect of the present invention, forms output signals Y, M and C of yellow, magenta and cyan from color signals B, G and R of blue, green, and red that are obtained by separating an image on an original, and outputs color materials on a recording medium in accordance with the output signals. The color image forming apparatus comprises:

basic matrix masking means (101 in FIG. 1, and FIG. 2) for correcting irregular absorption of the color materials by a matrix masking process in which the color signals B, G and R are multiplied by color correction coefficients;

color check output means (103 in FIG. 1, and FIG. 3) for producing color check signals $D_{/B/Y}$, $D_{G/M}$ and $D_{R/C}$ by solving the following equations $$D_{B/Y} = -(l_{B1}+l_{B2})B + l_{B1} G + l_{B2} R$$

$$D_{G/M} = l_{G1} B - (l_{G1}+l_{G2})G + l_{G2} R$$

$$D_{R/C} = l_{R1} B + l_{R2} G - (l_{R1}+l_{R2})R$$

where $l_{B1}$, $l_{B2}$, $l_{G1}$, $l_{G2}$, $l_{R1}$ and $l_{R2}$ are constants;

color adjustment setting holding means (106 and 107 in FIG. (1) for setting a desired color and a degree of color adjustment;

color adjusting coefficient holding means (105 in FIG. 1, and FIG. 4) for holding a color adjusting coefficient in accordance with the setting by the color adjustment setting means, and for correcting the held color adjusting coefficient, in accordance with the check results by the color check output means, so as to satisfy the following conditions, when $D_{B/Y}<0$, $\alpha_B=0$, when $D_{G/M}<0$, $\alpha_G=0$, when $D_{R/C}<0$, $\alpha_R=0$, when $D_{B/Y}>0$, $\alpha_Y=0$, when $D_{G/M}>0$, $\alpha_M=0$, when $D_{R/C}>0$, $\alpha_C=0$, color adjusting masking means (104 in FIG. 1, and FIG. 5) for obtaining color adjusting signals ΔY, ΔM, ΔC by solving the following matrix $$\begin{bmatrix} \Delta Y \\ \Delta M \\ \Delta C \end{bmatrix} = \begin{bmatrix} -\alpha_Y & \alpha_G & \alpha_R \\ \alpha_B & -\alpha_M & \alpha_R \\ \alpha_B & \alpha_G & -\alpha_C \end{bmatrix} \begin{bmatrix} D_{B/Y} \\ D_{G/M} \\ D_{R/C} \end{bmatrix}$$

where $D_{B/Y}$, $D_{G/M}$, $D_{R/C}$ output signals of the color check output means, and $\alpha_B$, $\alpha_G$, $\alpha_R$, $\alpha_Y$, $\alpha_M$, and $\alpha_C$: color adjusting coefficients outputted from the color adjusting coefficient holding means; and adder means (102 in FIG. 1, and FIG. 6) for adding together the output signal of the basic matrix masking means and the output signal of the color adjusting masking means, to output a color adjusted color signal.

A color image forming apparatus for exercising the method according to another aspect of the present invention has an arrangement which is basically the same as that of the above-mentioned color image forming apparatus. Specifically, the basic matrix masking means, color check means, color adjustment setting means, and adder means in the forming apparatus are the same as those in the latter apparatus.

The color adjusting coefficient means and the color adjusting masking means are additionally provided with means for intensifying a color to be adjusted by weakening a color density of the complementary color of the adjusted color. The color adjusting coefficient means (105, FIG. 14) includes a holding means (1401 to 1412) for holding color adjusting coefficients $\alpha_B$, $\alpha_G$, $\alpha_R$, $\alpha_Y$, $\alpha_M$, $\alpha_C$ for adjusting the colors of blue, green, red, yellow, magenta, and cyan in accordance with the setting of the color adjustment setting means, means (1413 to 1418) for generating color adjusting coefficients $\alpha_B'$, $\alpha_G'$, $\alpha_R'$, $\alpha_Y'$, $\alpha_M'$, $\alpha_C'$ for adjusting colors to be adjusted by adding and subtracting the complementary colors of the adjusted colors to and from the color adjusting coefficients $\alpha_B$, $\alpha_G$, $\alpha_R$, $\alpha_Y$, $\alpha_M$, $\alpha_C$, and means ($\overline{OE}$ terminals of 1401 to 1406) for correcting the held color adjusting coefficient, in accordance with the check results by the color check output means, so as to satisfy the following conditions, when $D_{B/Y}<0$, $\alpha_B=0$, $\alpha_B'=0$ when $D_{G/M}<0$, $\alpha_G=0$, $\alpha_G'=0$ when $D_{R/C}<0$, $\alpha_R=0$, $\alpha_R'=0$ when $D_{B/Y}>0$, $\alpha_Y=0$, $\alpha_Y'=0$ when $D_{G/M}>0$, $\alpha_M=0$, $\alpha_M'=0$ when $D_{R/C}>0$, $\alpha_C=0$, $\alpha_C'=0$ the color adjusting masking means (104, FIG. 15) generates color adjusting signals ΔY, ΔM, ΔC by solving the following matrix $$\begin{bmatrix} \Delta Y \\ \Delta M \\ \Delta C \end{bmatrix} = \begin{bmatrix} -\alpha_B' - \alpha_Y & \alpha_G + \alpha_M' & \alpha_R + \alpha_C' \\ \alpha_B + \alpha_Y' & -\alpha_G' - \alpha_M & \alpha_R + \alpha_C' \\ \alpha_B + \alpha_Y' & \alpha_G + \alpha_M' & -\alpha_R' - \alpha_C \end{bmatrix} \begin{bmatrix} D_{B/Y} \\ D_{G/M} \\ D_{R/C} \end{bmatrix}$$

where $D_{B/Y}$, $D_{G/M}$, $D_{R/C}$: output signals of the color check output means, and $\alpha_B$, $\alpha_G$, $\alpha_R$, $\alpha_Y$, $\alpha_M$, $\alpha_C$, and $\alpha_B'$, $\alpha_G'$, $\alpha_R'$, $\alpha_Y'$, $\alpha_M'$, and $\alpha_C'$: color adjusting coefficients outputted from the color adjusting coefficient means; and adder means for adding together the output signal of the basic matrix masking means and the output signal of the color adjusting masking means, to output a color adjusted color signal.

An operation of the present invention will be mathematically described by using a case using a 3×3 matrix.

A basic matrix masking in the color printing or the color copying machine is given by an equation (1)

$$\begin{bmatrix} Y_0 \\ M_0 \\ C_0 \end{bmatrix} = \begin{bmatrix} a_{11} a_{12} a_{13} \\ a_{21} a_{22} a_{23} \\ a_{31} a_{32} a_{33} \end{bmatrix} \begin{bmatrix} B \\ G \\ R \end{bmatrix} \quad (1)$$

where

B, G and R: density of input color signals of blue, green and red, $Y_0$, $M_0$, $C_0$: density of output color signals of yellow, magenta and cyan before color adjusted, and $a_{11}$ to $a_{33}$: color correcting coefficients.

In the present invention, color adjusting coefficients $\alpha_R$, $\alpha_G$, $\alpha_B$, $\alpha_Y$, $\alpha_M$ and $\alpha_C$ for adjusting colors of red, green, blue, yellow, magenta, and cyan are added to or subtracted from the color correcting coefficients $a_{11}$ to $a_{33}$.

In the specification, the basic masking for removing the irregular absorption of ink or toner is called "color correction". The masking for correcting an abnormal color on an original image and correcting a specific color as desired is called "color adjustment".

(A) Principles of Independent Six-Color Adjustments

Let us consider a case that red in an image on a color original is intensified. Red is the composite color of magenta and yellow. Therefore, the red color can be intensified by increasing the output densities $Y_0$ and $M_0$ of yellow and magenta. When considering this in terms of the input density, it can be attained by increasing the densities of blue and green.

To realize this in the matrix (1), a red adjusting coefficient $\alpha_R$ is added to the elements which are positioned in the first and second rows corresponding to the output densities $Y_0$ and $M_0$ and in the first and second columns corresponding to the input densities B and G, as given below $$\begin{bmatrix} a_{11} + \alpha_R & a_{12} + \alpha_R & a_{13} \\ a_{21} + \alpha_R & a_{22} + \alpha_R & a_{23} \\ a_{31} & a_{32} & a_{33} \end{bmatrix} \quad (2)$$

In the above matrix (2), the sum of the coefficients in the row is not 1. This implies that a gray level in the original image cannot be maintained after the color adjustments. To make the sum equal to 1, $2\alpha_R$ is subtracted from the color correction coefficient to which the red color adjusting coefficient $\alpha_R$ is not added, as in a matrix (3)

$$\begin{bmatrix} a_{11} + \alpha_R & a_{12} + \alpha_R & a_{13} - 2\alpha_R \\ a_{21} + \alpha_R & a_{22} + \alpha_R & a_{23} - 2\alpha_R \\ a_{31} & a_{32} & a_{33} \end{bmatrix} \quad (3)$$

Correspondingly applying the above process to the other colors, green, blue, yellow, magenta and cyan, we have $$\begin{bmatrix} a_{11} + \alpha_G + \alpha_R + 2\alpha_Y & a_{12} - 2\alpha_G + \alpha_R - \alpha_Y & a_{13} + \alpha_G - 2\alpha_R - \alpha_Y \\ a_{21} - 2\alpha_B + \alpha_R - \alpha_M & a_{22} + \alpha_B + \alpha_R + 2\alpha_M & a_{23} + \alpha_B - 2\alpha_R - \alpha_M \\ a_{31} - 2\alpha_B + \alpha_G - \alpha_C & a_{32} + \alpha_B - 2\alpha_G - \alpha_C & a_{33} + \alpha_B + \alpha_G + 2\alpha_C \end{bmatrix} \quad (4)$$

where $\alpha_B$, $\alpha_G$, $\alpha_Y$, $\alpha_M$ and $\alpha_C$ are the color adjusting coefficients of blue, green, yellow, magenta and cyan. Therefore, the matrix masking formula can be expressed $$\begin{bmatrix} Y \\ M \\ C \end{bmatrix} = \begin{bmatrix} a_{11} + \alpha_G + \alpha_R + 2\alpha_Y & a_{12} - 2\alpha_G + \alpha_R - \alpha_Y & a_{13} + \alpha_G - 2\alpha_R - \alpha_Y \\ a_{21} - 2\alpha_B + \alpha_R - \alpha_M & a_{22} + \alpha_B + \alpha_R + 2\alpha_M & a_{23} + \alpha_B - 2\alpha_R - \alpha_M \\ a_{31} - 2\alpha_B + \alpha_G - \alpha_C & a_{32} + \alpha_B - 2\alpha_G - \alpha_C & a_{33} + \alpha_B + \alpha_G + 2\alpha_C \end{bmatrix} \begin{bmatrix} B \\ G \\ R \end{bmatrix} \quad (5)$$

Let us consider color change quantities after the color adjustments.

Let the color change quantities of the output densities Y, M and C after the color adjustments be $\Delta Y$, $\Delta M$, and $\Delta C$. The quantities $\Delta Y$, $\Delta M$ and $\Delta C$ can be $$\begin{bmatrix} \Delta Y \\ \Delta M \\ \Delta C \end{bmatrix} = \quad (8)$$

$$\begin{bmatrix} +\alpha_G + \alpha_R + 2\alpha_Y & -2\alpha_G + \alpha_R - \alpha_Y & \alpha_G - 2\alpha_R - \alpha_Y \\ -2\alpha_B + \alpha_R - \alpha_M & \alpha_B + \alpha_R + 2\alpha_M & \alpha_B - 2\alpha_R - \alpha_M \\ -2\alpha_B + \alpha_G - \alpha_C & \alpha_B - 2\alpha_G - \alpha_C & \alpha_B + 2\alpha_G + 2\alpha_C \end{bmatrix} \begin{bmatrix} B \\ G \\ R \end{bmatrix}$$

$$= \begin{bmatrix} -\alpha_Y & \alpha_G & \alpha_R \\ \alpha_B & -\alpha_M & \alpha_R \\ \alpha_B & \alpha_G & -\alpha_C \end{bmatrix} \begin{bmatrix} -2 & 1 & 1 \\ 1 & -2 & 1 \\ 1 & 1 & -2 \end{bmatrix} \begin{bmatrix} B \\ G \\ R \end{bmatrix} \quad (7)$$

From the matrices (1) and (7), the output densities Y, M and C after the color adjustments are $$\begin{bmatrix} Y \\ M \\ C \end{bmatrix} = \begin{bmatrix} Y_0 \\ M_0 \\ C_0 \end{bmatrix} + \begin{bmatrix} \Delta Y \\ \Delta M \\ \Delta C \end{bmatrix} = \begin{bmatrix} a_{11} a_{12} a_{13} \\ a_{21} a_{22} a_{23} \\ a_{31} a_{32} a_{33} \end{bmatrix} \begin{bmatrix} B \\ G \\ R \end{bmatrix} + \begin{bmatrix} -\alpha_Y & \alpha_G & \alpha_R \\ \alpha_B & -\alpha_M & \alpha_R \\ \alpha_B & \alpha_G & -\alpha_C \end{bmatrix} \begin{bmatrix} D_{B/Y} \\ D_{G/M} \\ D_{R/C} \end{bmatrix} \quad (8)$$

where $$D_{B/Y} = -2B + G + R$$

$$D_{G/M} = B - 2G + R$$

$$D_{R/C} = B + G - 2R$$

(B) Color Adjustment by Reducing the complementary Colors

As already described in item (A) above, to intensify the red color, it is only needed that the output densities $Y_O$ and $M_0$ of yellow and magenta are increased or the input densities of blue and green are increased. Alternatively, the red can be intensified, viz., color purity can be improved, by reducing the output density $C_0$ of cyan as the complementary color of red or reducing the input density of red. When applying the alternative to the matrix (3), we have $$\begin{bmatrix} a_{11} + \alpha_R a_{12} + \alpha_R a_{13} - 2\alpha_R \\ a_{21} + \alpha_R a_{22} + \alpha_R a_{23} - 2\alpha_R \\ a_{31} - \alpha_R' a_{32} - \alpha_R' a_{33} + 2\alpha_R' \end{bmatrix} \quad (3')$$

When applying the same to the matrices (4) to (6), finally the matrix (7) can be rewritten into $$\begin{bmatrix} \Delta Y \\ \Delta M \\ \Delta C \end{bmatrix} = $$

$$\begin{bmatrix} -\alpha_B' - \alpha_Y & \alpha_G + \alpha_M' & \alpha_R + \alpha_C \\ \alpha_B + \alpha_Y' & -\alpha_G' - \alpha_M & \alpha_R + \alpha_C' \\ \alpha_B + \alpha_Y' & \alpha_G + \alpha_M' & -\alpha_R' - \alpha_C \end{bmatrix} \begin{bmatrix} -2 & 1 & 1 \\ 1 & -2 & 1 \\ 1 & 1 & -2 \end{bmatrix} \begin{bmatrix} B \\ G \\ R \end{bmatrix} \quad (7')$$

where $\alpha_B$, $\alpha_G$, $\alpha_R$, $\alpha_Y$, $\alpha_M$ and $\alpha_C$: color adjusting coefficients, and $\alpha_B'$, $\alpha_G'$, $\alpha_R'$, $\alpha_Y'$, and $\alpha_M'$, and $\alpha_C'$: color adjusting coefficients for adjusting a color to be adjusted by adjusting the complementary color of the adjusted color.

If all of the above coefficients are independently adjustable, 12 adjustments are required. If $\alpha_i' = m_i \times \alpha_i$ (i =B, G, R, Y, M, and C, and $m_i$ is constant), the number of adjustments is only 6 for the colors, B, G, R, Y, M, and C.

From the matrices (1) and (7)', the output densities Y, M and C after the color adjustments can be given $$\begin{bmatrix} Y \\ M \\ C \end{bmatrix} = \begin{bmatrix} Y_0 \\ M_0 \\ C_0 \end{bmatrix} + \begin{bmatrix} \Delta Y \\ \Delta M \\ \Delta C \end{bmatrix} = \begin{bmatrix} a_{11} a_{12} a_{13} \\ a_{21} a_{22} a_{23} \\ a_{31} a_{32} a_{33} \end{bmatrix} \begin{bmatrix} B \\ G \\ R \end{bmatrix} + \quad (8')$$

$$\begin{bmatrix} -\alpha_B' - \alpha_Y & \alpha_G + \alpha_M' & \alpha_R + \alpha_C \\ \alpha_B + \alpha_Y' & -\alpha_G' - \alpha_M & \alpha_R + \alpha_C' \\ \alpha_B + \alpha_Y' & \alpha_G + \alpha_M' & -\alpha_R' - \alpha_C \end{bmatrix} \begin{bmatrix} D_{B/Y} \\ D_{G/M} \\ D_{R/C} \end{bmatrix}$$

where $$D_{B/Y} = -2B + G + R$$

$$D_{G/M} = B - 2G + R$$

$$D_{R/C} = B + G - 2R$$

(C) Removal of Unnecessary Color Changes Arising From Color Adjustments

In the color adjustments based only on the matrices (8) or (8)', in the case of intensifying red, for example, yellow and magenta are reduced in the region of cyan as the complementary color of red. This results in a change in the colors of green and blue, which contain cyan. To cope with this, in the present invention, the color is checked, and the complementary color is prevented from being changed.

In the color adjustment based on the matrices (8) or (8)', colors on an original image are checked by using $D_{B/Y}$, $D_{B/M}$ and $D_{R/C}$. The color adjusting coefficients used for the matrices (8) or (8)', are modified in accordance with the results of the check.

In the color adjustment based on the matrix (8), the color adjusting coefficients are selected for DB/Y, DB/M and DR/C, as $$\left. \begin{array}{ll} D_{B/Y} < 0 & , \alpha_B = 0 \\ D_{G/M} < 0 & , \alpha_G = 0 \\ D_{R/C} < 0 & , \alpha_R = 0 \\ D_{B/Y} > 0 & , \alpha_Y = 0 \\ D_{G/M} > 0 & , \alpha_M = 0 \\ D_{R/C} > 0 & , \alpha_C = 0 \end{array} \right\} \quad (9)$$

In the color adjustment based on the matrix (8)', the color adjusting coefficients are selected for $D_{B/Y}$, $D_{B/M}$ and $D_{R/C}$, as follows:

$$\left. \begin{array}{lll} D_{B/Y} < 0 & , \alpha_B = 0 & \alpha_B' = 0 \\ D_{G/M} < 0 & , \alpha_G = 0 & \alpha_G' = 0 \\ D_{R/C} < 0 & , \alpha_R = 0 & \alpha_R' = 0 \\ D_{B/Y} > 0 & , \alpha_Y = 0 & \alpha_Y' = 0 \\ D_{G/M} > 0 & , \alpha_M = 0 & \alpha_M' = 0 \\ D_{R/C} > 0 & , \alpha_C = 0 & \alpha_C' = 0 \end{array} \right\} \quad (9')$$

In the above conditions given by equations (9) and (9)', $D_{B/Y}$ is used for checking green and yellow, $D_{G/M}$ for blue and magenta, and $D_{R/C}$ for red and cyan.

(D) Gray Level Keeping Conditions

The conditions for keeping the gray level on an original will be described.

To keep the gray level on an original image even after the color adjustments, it is necessary to set the input densities B, G and R in the matrix (1) at the END (equivalent neutral density), and to select the color correction coefficients $a_{11}$ to $a_{33}$ so as to satisfy the following equations (10)

$$\left.\begin{array}{l} a_{11} + a_{12} + a_{13} = 1 \\ a_{21} + a_{22} + a_{23} = 1 \\ a_{31} + a_{32} + a_{33} = 1 \end{array}\right\} \quad (10)$$

If for the gray level, $B=G=R=Gr$, from the matrix formula (1) the output density $Y_0$ is $$Y_0 = a_{11}G_r + a_{12}G_r + a_{13}G_r = G_r(a_{11}+a_{12}+a_{13})$$

If $a_{11}+a_{12}+a_{13}=1$, $Y_0=G_r$.

The output densities $M_0$ and $C_0$, that are calculated in similar ways, are $M_0=G_r$ and $C_0 G_r$.

Consequently, $Y_0=M_0=C_0=G_r$.

This relation shows that a gray level on the original image can be maintained irrespective of the changes of the individual correction coefficients.

If the equations (10) are satisfied, the gray level on the original image is maintained irrespective of the color adjustments, because the total sum of the rows of the $3 \times 3$ matrix of (7)' is zero.

(E) Extension of Matrix Formula (1)

In the formula (1), the matrix size for the matrix masking is $3 \times 3$, but it may be further increased, for example, a $3 \times 9$ matrix as given below $$\begin{bmatrix} Y \\ M \\ C \end{bmatrix} = \begin{bmatrix} aaa \ldots a \\ aaa \ldots a \\ aaa \ldots a \end{bmatrix} \begin{bmatrix} B \\ G \\ R \\ BG \\ GR \\ RB \\ B^2 \\ G^2 \\ R^2 \end{bmatrix} \quad (12)$$

In this matrix $3 \times 9$, the color adjustment is applied to 3 rows and 3 columns. To maintain the gray level, the input densities B, G and R are set at the END, and the collection coefficients $a_{11}$ to $a_{19}$ are selected so as to satisfy the following equations (13)

$$\left.\begin{array}{l} a_{11} + a_{12} + a_{13} = 1 \\ a_{21} + a_{22} + a_{23} = 1 \\ a_{31} + a_{32} + a_{33} = 1 \\ a_{14} + a_{15} + \ldots + a_{19} = 0 \\ a_{24} + a_{25} + \ldots + a_{29} = 0 \\ a_{34} + a_{35} + \ldots + a_{39} = 0 \end{array}\right\} \quad (13)$$

The matrix (7)' may be extended below $$\begin{bmatrix} \Delta Y \\ \Delta M \\ \Delta C \end{bmatrix} = \begin{bmatrix} -\alpha_B' - \alpha_Y & \alpha_G + \alpha_M' & \alpha_R + \alpha_C' \\ \alpha_B + \alpha_Y' & -\alpha_G' - \alpha_M & \alpha_R + \alpha_C' \\ \alpha_B + \alpha_Y' & \alpha_G + \alpha_M' & -\alpha_R' - \alpha_C \end{bmatrix} \times \quad (14)$$

-continued $$\begin{bmatrix} -(l_{B1}+l_{B2}) & l_{B1} & l_{B2} \\ l_{G1} & -(l_{G1}+l_{G2}) & l_{G2} \\ l_{R1} & l_{R2} & -(l_{R1}+l_{R2}) \end{bmatrix} \begin{bmatrix} B \\ G \\ R \end{bmatrix}$$

where $l_{B1}$, $l_{B2}$, $l_{G1}$, $l_{G2}$, $l_{R1}$, and $l_{R2}$: constants.

If the constants $l_{B1}$, $l_{B2}$, $l_{G1}$, $l_{G2}$, $l_{R1}$, and $l_{R2}$ are appropriately selected, the color adjustment areas of red, green and blue can be shifted from one another.

In this case, the equations for the color check are as follows:

$$D_{B/Y} = -(l_{B1}+l_{B2})B + l_{B1}G + l_{B2}R$$

$$D_{G/M} = l_{G1}B - (l_{G1}+l_{G2})G + l_{G2}R$$

$$D_{R/C} = l_{R1}B + l_{R2}G - (l_{R1}+l_{R2})R$$

The matrix (6) corresponds to the matrix (14) when $l_{B1}=l_{B2}=l_{G1}=l_{G2}=l_{R1}=l_{R2}=1$.

DETAILED DESCRIPTION OF THE INVENTION

An apparatus for exercising the color adjusting method according to the present invention will be described with reference to the accompanying drawings. The embodiments to follow are based on the $3 \times 9$ matrix (12) described above.

Embodiment 1

Figure 1:
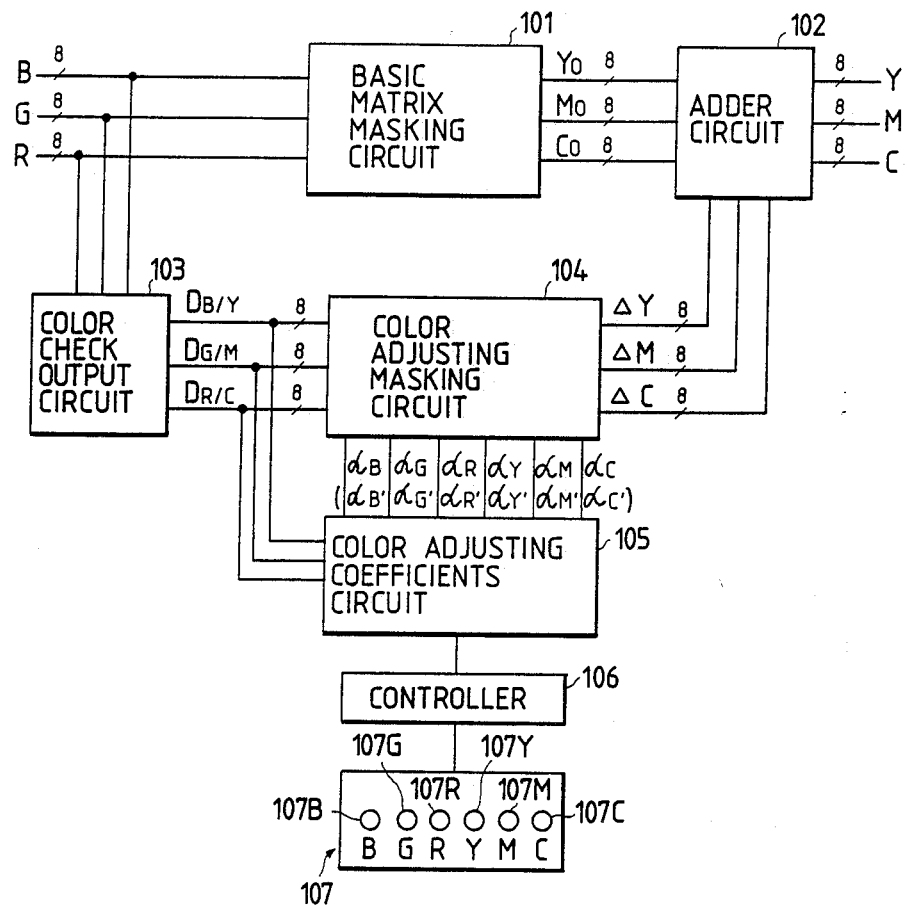
FIG. 1 is a block diagram of a color adjusting apparatus according to an embodiment of the present invention.

FIG. 1 shows a block diagram of a color adjusting apparatus according to an embodiment of the present invention. Signals resulting from a color separation of an image on a color original are subjected to the necessary pre-processings, such as a shading correction and an END conversion. By the pre-processings, these signals become input density signals B, G and R, which in turn are inputted to a basic matrix masking circuit 101.

The masking circuit 101 performs the matrix operation of the matrix formula (1), and produces output density signals $Y_0$, $M_0$ and $C_0$ before color adjustments. The signals $Y_0$, $M_0$ and $C_0$ are inputted to an adder circuit 102. The input density signals B, G and R are supplied to a color check output circuit 103. The circuit 103 produces the color check output signals $D_{B/Y}$, $D_{G/M}$, and $D_{R/C}$, which is given by the relations (9) and represent the results of checking the colors of the original image. The output signals of the circuit 103 are applied to a color adjustment masking circuit 104.

The color adjustment masking circuit 104 is for generating color adjusting quantities $\Delta Y$, $\Delta M$ and $\Delta C$ by using the color check output signals $D_{B/Y}$, $D_{G/M}$, and $D_{R/C}$ from the color check output circuit 103, and the color adjusting coefficients $\alpha_B$, $\alpha_G$, $\alpha_R$, $\alpha_Y$, $\alpha_M$ and $\alpha_C$ of blue, green, red, yellow, magenta, and cyan, which are derived from a color adjusting coefficients circuit 105. The color adjusting quantities $\Delta Y$, $\Delta M$ and $\Delta C$, which are derived from the masking circuit 104 are applied to the adder circuit 102.

The color adjusting coefficients circuit 105 holds the color adjusting coefficients $\alpha_B$, $\alpha_G$, $\alpha_R$, $\alpha_Y$, $\alpha_M$ and $\alpha_C$ of blue, green, red, yellow, magenta, and cyan, which are set by a controller 106 in accordance with the color adjusting input signals derived from a console 107 with color adjusting knobs 107B to 107C. The color adjusting coefficients are applied to the masking circuit 104.

The adder circuit 102 receives the output density signals $Y_0$, $M_0$ and $C_0$ before the color adjustments from the basic matrix masking circuit 101, and the color adjusting quantities $\Delta Y$, $\Delta M$ and $\Delta C$ from the color adjustment masking circuit 104. The circuit 104 adds together those signals for each color, and produces the output density signals Y, M and C.

In accordance with the signals Y, M and C, the color materials of yellow, magenta and cyan are outputted on a recording medium, thereby to reproduce a color image. Actually, a black signal is formed from the output density signals Y, M and C, and the color image is formed by using four kinds of color materials.

The description to follow is elaboration of each circuit of the color adjusting apparatus.

Figure 2:
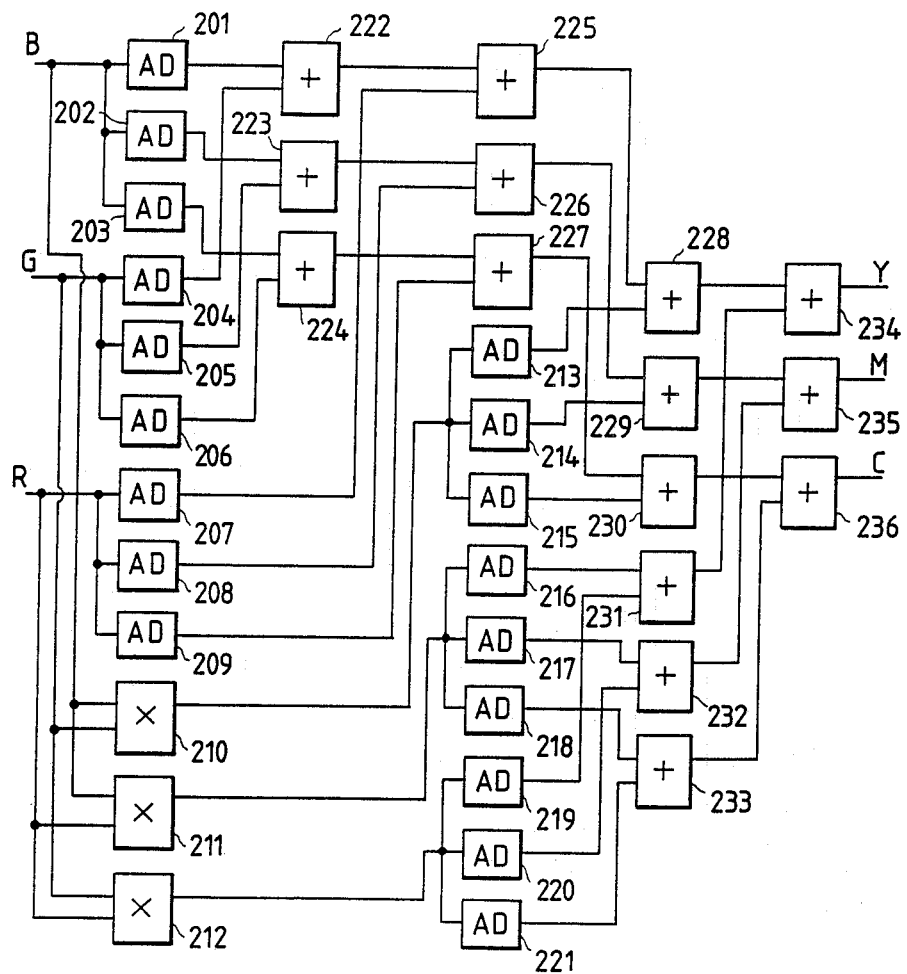
FIG. 2 is a block diagram of a basic matrix masking circuit.

FIG. 2 is a circuit diagram of the basic matrix masking circuit.

In the figure, reference numerals 201 to 209 represent memory tables for providing $a_{11}B + a_{17}B^2$ to $a_{33}R + a_{39}R^2$ shown in the matrix (12). These memory tables 201 to 209 are constructed with ROMs. The contents of the table for blue (B) are shown in Table 1.

TABLE 1

| Address input (B) | Data output ($a_{11}B + a_{17}B^2$) |
|---|---|
| 0 | 0 |
| 1 | $a_{11} + a_{17}$ |
| 2 | $2a_{11} + 4a_{17}$ |
| 3 | $3a_{11} + 9a_{17}$ |
| . | |
| 255 | $255a_{11} + 65025a_{17}$ |

Mulitpliers 210 to 212 obtains the products BG, GR and RB of the input density signals B, G and R. The output signals of the multipliers are inputted to memory tables 213 to 221, which generate $a_{14}BG$ to $a_{36}RB$.

The terms thus obtained are added together for each color by adders 222 to 236, thereby to generate output density signals $Y_0$, $M_0$ and $C_0$ before color adjustments.

Figure 3:
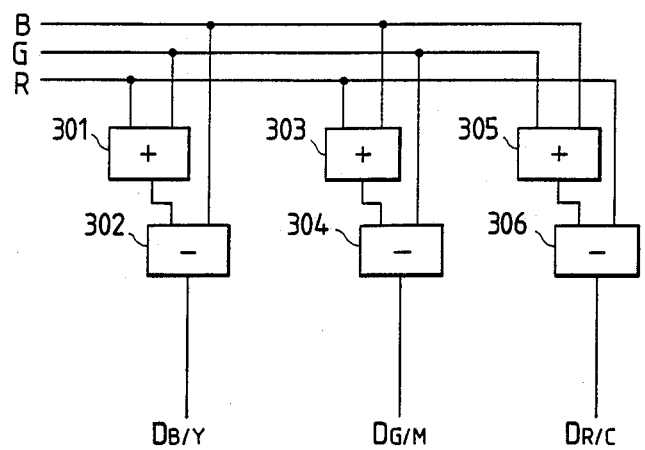
FIG. 3 is a block diagram of a color check output circuit.

FIG. 3 is a circuit diagram of the color check output circuit.

The input density signals G and R are inputted to an adder 301, which produces a G+R signal. The G+R signal, together with the input density signal B, is applied to a subtractor 302, which produces a signal of $D_{B/Y} = -2B + G + R$.

$D_{R/C}$ and $D_{G/M}$ are also obtained through the combinations of an adder 303 and a subtractor 304, and an adder 305 and a subtractor 306.

Figure 4:
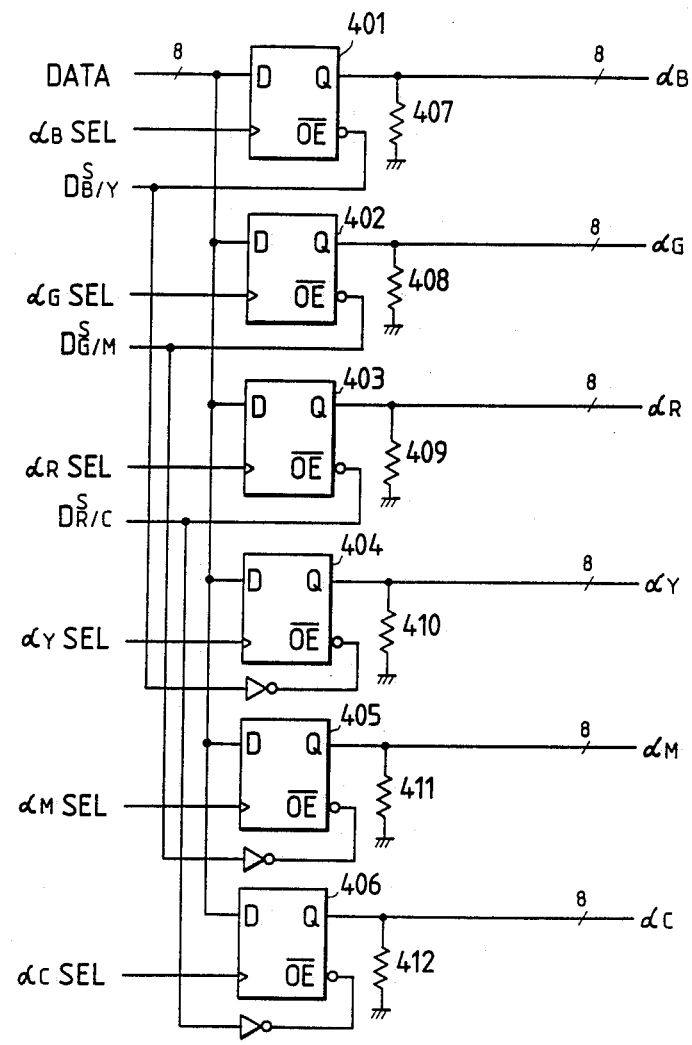
FIG. 4 is a block diagram of a color adjusting coefficients circuit used in the first embodiment.

FIG. 4 is a circuit diagram of the color adjusting coefficients circuit.

The color adjusting coefficients circuit is made up of latches 401 to 406. These latches receive at the data terminal D, through the controller 106, the coefficients data set by the color adjusting knobs 107B to 107C of the console 107 (see FIG. 1). Under this condition, the latches successively receive at other terminals select signals $\alpha_B$SEL, $\alpha_G$SEL, $\alpha_R$SEL, $\alpha_Y$SEL, $\alpha_M$SEL and $\alpha_G$SEL. As a result, the color adjusting coefficients $\alpha B$, $\alpha G$, $\alpha R$, $\alpha Y$, $\alpha M$ and $\alpha C$ are set in accordance with the color adjusting quantities.

Then, sign bits $D^S_{B/Y}$, $D^S_{G/M}$ and $D^S_{R/C}$ of the output signals $D_{B/Y}$, $D_{G/M}$ and $D_{R/C}$ from the color check output circuit 103, and their inverted sign bits $\overline{D^S}_{B/Y}$, $\overline{D^S}_{G/M}$ and $\overline{D^S}_{R/C}$ are applied to the output control terminals $\overline{OE}$ of the latches 401 to 406. The coefficients $\alpha_B$ to $\alpha_C$ when the relations (9) are satisfied are zeroed through resistors 407 to 412.

Figure 5:
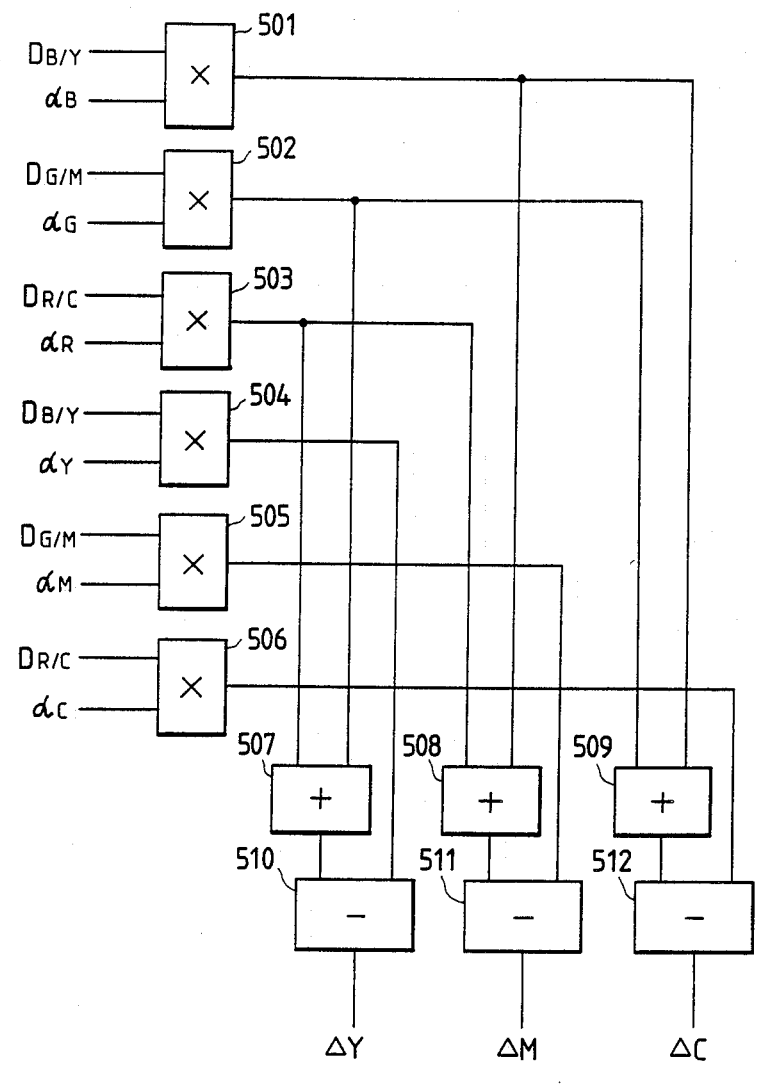
FIG. 5 is a block diagram of a color adjusting masking circuit used in the first embodiment.

FIG. 5 is a circuit diagram of the color adjusting masking circuit.

The color check output signals $D_{B/Y}$, $D_{G/M}$ and $D_{R/C}$ from the color check output circuit 103, and the color adjusting coefficients $\alpha_B$, $\alpha_G$, $\alpha_R$, $\alpha_Y$, $\alpha_M$ and $\alpha_C$ from the color adjusting coefficients circuit 105, are applied to the color adjusting masking circuit. In the circuit, these are multiplied by multipliers 501 to 506, to generate $\alpha^B D_{B/Y}$, $\alpha^G D_{G/M}$, $\alpha^R D_{R/C}$, $\alpha^Y D_{B/Y}$, $\alpha^M D_{G/M}$ and $\alpha^C D_{R/C}$. Those signals are applied to circuitry including adders 507 to 509 and subtractors 510 to 512, thereby to generate color adjusting quantities $\Delta C$, $\Delta M$, $\Delta Y$.

The color adjusting coefficients $\alpha_B$ to $\alpha_C$ are generally fractions between $-1.0$ and $1.0$. Therefore, the figure matching must be made in a manner that these coefficients are multiplied by an appropriate power of 2 into integers, these integers are inputted to the latches 401 to 406 in the color adjusting coefficients circuit shown in FIG. 4, and the lower order bits of of the multipliers 501 to 506 shown in FIG. 5 are discarded.

Figure 6:
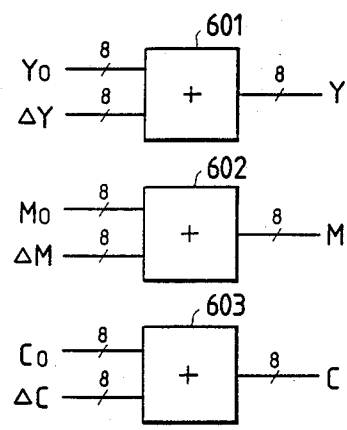
FIG. 6 is a block diagram of an adder circuit.

The adder circuit shown in FIG. 6 adds together for each color, the output density signals $Y_0$, $M_0$ and $C_0$ before color adjustments, which are outputted from the basic matrix masking circuit 101, and the color adjusting quantities $\Delta Y$, $\Delta M$ and $\Delta C$, which are derived from the color adjusting masking circuit 104. The additions are performed by adders 601 to 603 contained in the adder circuit.

In the present embodiment, the individual color adjusting masking circuit 104 is provided, but if required, it may be contained in the basic matrix masking circuit 101. For example, this can be realized in the following way. The memory components for the tables 201 to 209, and 213 to 221 are constructed with reprogrammable memory components (RAMs). The sign bit signals outputted from the subtractors 302, 306 and 310 in the color check output circuit shown in FIG. 3 are additionally applied to the address terminals of the RAMs. The RAMs prestore a total of 8 types of operation tables for three colors blue, green and red, as shown in Table 2. In the table, O requires the color adjustment, and x requires no color adjustment.

TABLE 2

|   | 1 | 2 | 3 | 4 | 5 | 6 | 7 | 8 |
|---|---|---|---|---|---|---|---|---|
| B | X | X | X | X | O | O | O | O |
| G | X | X | O | O | X | X | O | O |
| R | X | O | X | O | X | O | X | O |

The first embodiment has been described by using a color hard copying machine, such as a color laser zerography, color thermal printer, and color ink jet printer. If necessary, the present invention is applicable for an apparatus using films and printing papers, such as a plate-making color scanner and a laser scan color camera.

TABLE 3

| Colors on original | Input Density | | | Color change quantity (when red is intensified) $\alpha_R = 0.01$ Other coefficients $+$ 0 | | | Color change quantity (When green is intensified) $\alpha_G = 0.01$ other coefficients $= 0$ | | | Color change quantity (when blue is intensified) $\alpha_B = 0.01$ other coefficients $= 0$ | | |
|---|---|---|---|---|---|---|---|---|---|---|---|---|
|  | B | G | R | $\Delta Y$ | $\Delta M$ | $\Delta C$ | $\Delta Y$ | $\Delta M$ | $\Delta C$ | $\Delta Y$ | $\Delta M$ | $\Delta C$ |
| Blue | 50 | 200 | 200 | 0 | 0 | 0 | 0 | 0 | 0 | 0 | 30 | 30 |
| Cyan | 50 | 50 | 200 | 0 | 0 | 0 | 15 | 0 | 15 | 0 | 15 | 15 |
| Green | 200 | 50 | 200 | 0 | 0 | 0 | 30 | 0 | 30 | 0 | 0 | 0 |
| Yellow | 200 | 50 | 50 | 15 | 15 | 0 | 15 | 0 | 15 | 0 | 0 | 0 |
| Red | 200 | 200 | 50 | 30 | 30 | 0 | 0 | 0 | 0 | 0 | 0 | 0 |
| Magenta | 50 | 200 | 50 | 15 | 15 | 0 | 0 | 0 | 0 | 0 | 15 | 15 |
| Gray | 150 | 150 | 150 | 0 | 0 | 0 | 0 | 0 | 0 | 0 | 0 | 0 |

| Colors on original | Color change quantity (when yellow is intensified) $\alpha_Y = 0.01$ other coefficients $= 0$ | | | Color change quantity (when magenta is intensified) $\alpha_M = 0.01$ other coefficients $= 0$ | | | Color change quantity (when cyan is intensified) $\alpha_C = 0.01$ other coefficients $= 0$ | | |
|---|---|---|---|---|---|---|---|---|---|
|  | $\Delta Y$ | $\Delta M$ | $\Delta C$ | $\Delta Y$ | $\Delta M$ | $\Delta C$ | $\Delta Y$ | $\Delta M$ | $\Delta C$ |
| Blue | 0 | 0 | 0 | 0 | 15 | 0 | 0 | 0 | 15 |
| Cyan | 0 | 0 | 0 | 0 | 0 | 0 | 0 | 0 | 30 |
| Green | 15 | 0 | 0 | 0 | 0 | 0 | 0 | 0 | 15 |
| Yellow | 30 | 0 | 0 | 0 | 0 | 0 | 0 | 0 | 0 |
| Red | 15 | 0 | 0 | 0 | 15 | 0 | 0 | 0 | 0 |
| Magenta | 0 | 0 | 0 | 0 | 30 | 0 | 0 | 0 | 0 |
| Gray | 0 | 0 | 0 | 0 | 0 | 0 | 0 | 0 | 0 |

A color adjusting region within which the color adjustment is effective, and a degree of color adjustment or color change quantity in the color adjustments, which are performed in the present embodiment, will be described with reference to Table 3. In this table, the input densities are expressed in terms of converted values between 0 to 255.

Figure 7:
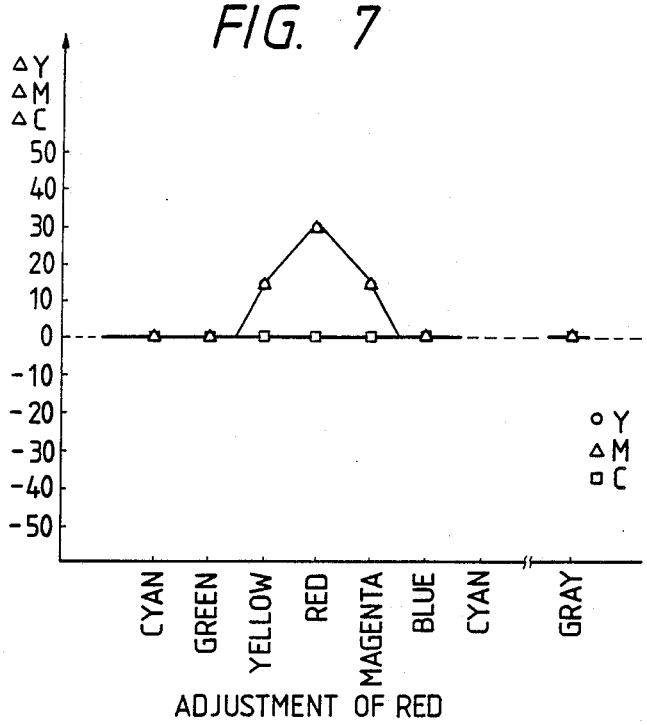
FIGS. 7 through 12 are graphs showing variations of a yellow signal, magenta signal, and cyan signal when red, green, blue, yellow, magenta, and cyan are adjusted in the first embodiment.
Figure 8:
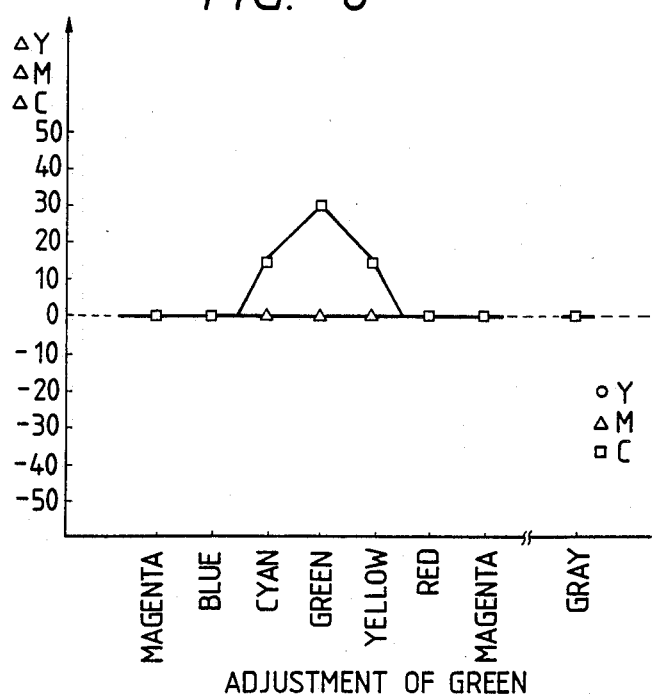
Figure 9:
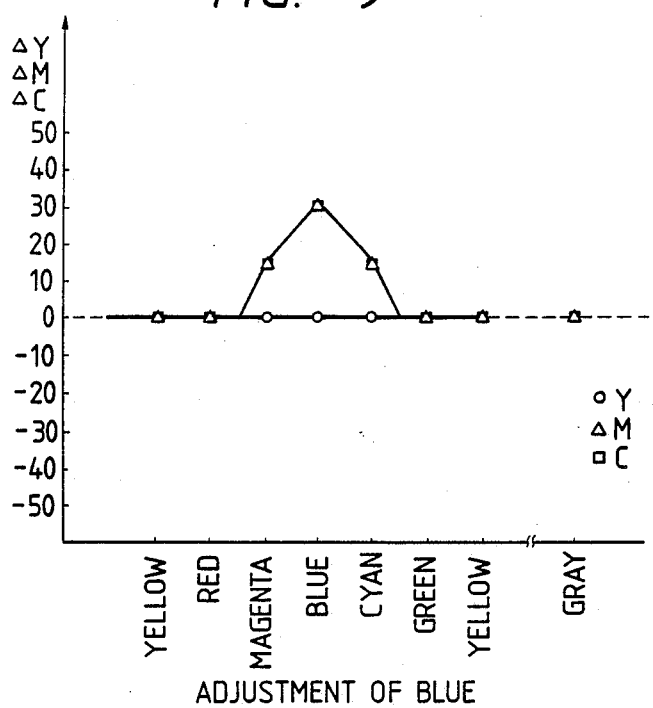
Figure 10:
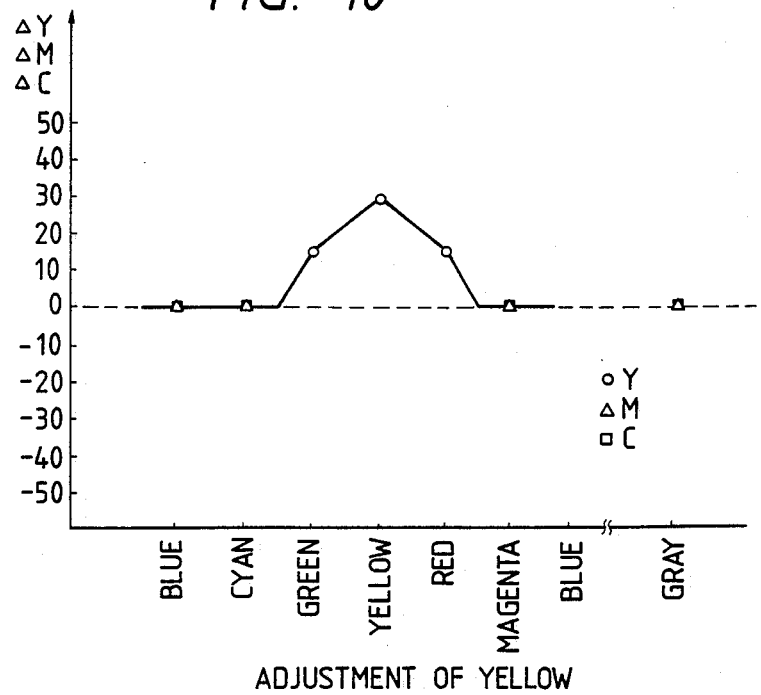
Figure 11:
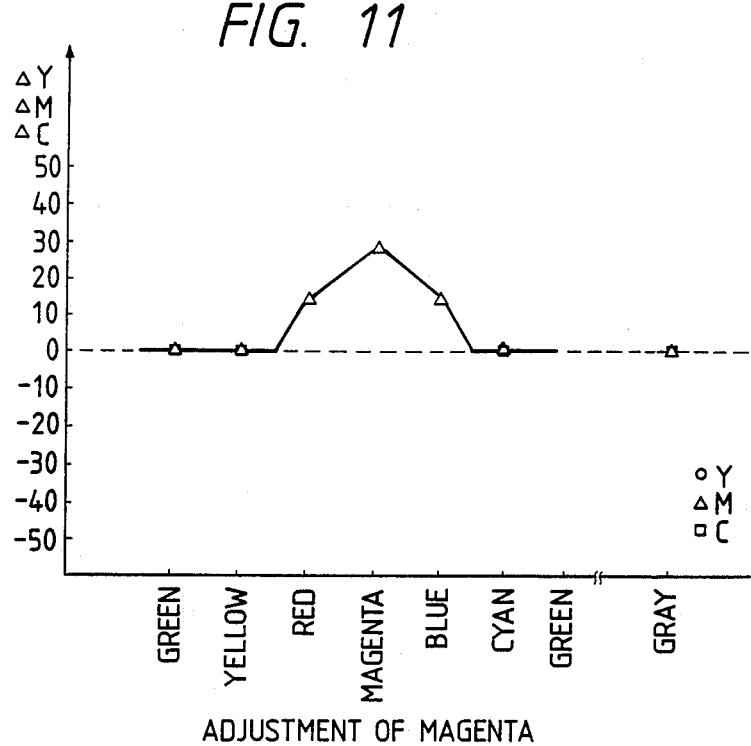
Figure 12:
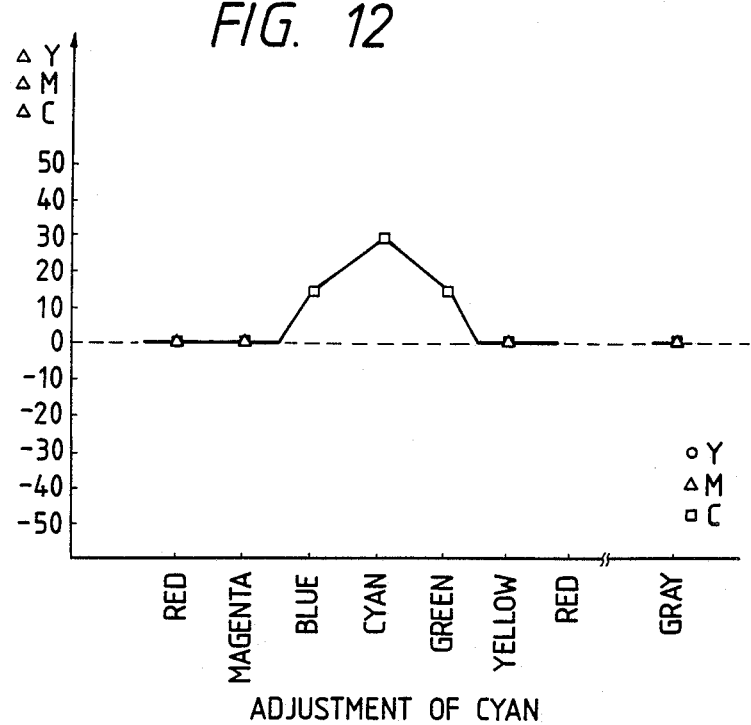

The change quantities of red, green, blue, yellow, magenta, and cyan due to the color adjustment shown in Table 3 are graphically represented as shown in FIGS. 7 to 13. A graph of FIG. 7 is for a case that red is intensified when $\alpha_R=0.1$ and $\alpha_B=\alpha_C=0$; a graph of FIG. 8 for a case that green is intensified when $\alpha_G=0.1$ and $\alpha_R=\alpha_B=0$; a graph of FIG. 9 for a case that blue is intensified when $\alpha_B=0.1$ and $\alpha_G=\alpha_R=0$; a graph of FIG. 10 for a case that yellow is intensified when $\alpha_Y=0.1$; a graph of FIG. 11 for a case that magenta is intensified when $\alpha_M=0.1$; and a graph of FIG. 12 for a case that cyan is intensified when $\alpha_C=0.1$.

Figure 13:
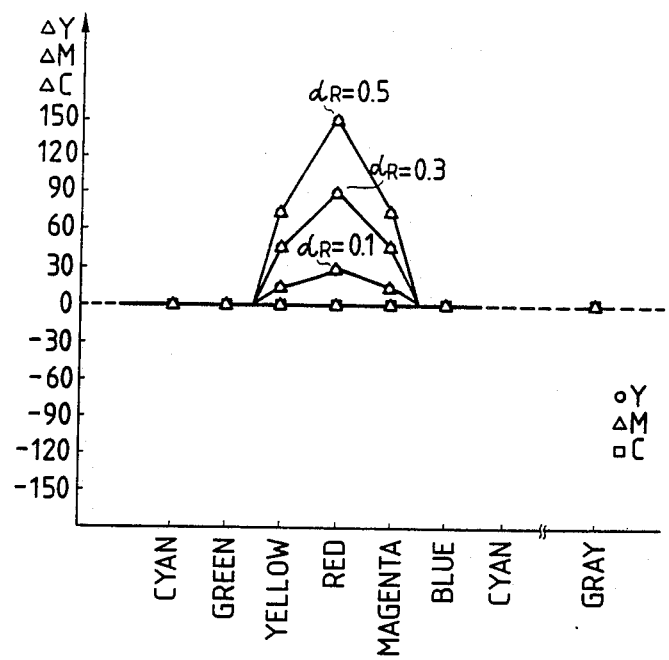
FIG. 13 is a graph showing a variation of the red after it is adjusted against several different red color adjusting coefficients in the first embodiment.

The change quantity of red varies as shown in FIG. 13 against 0.1, 0.3 and 0.5 of the red adjusting coefficient $\alpha_R$.

In the present embodiment, when red can be intensified as shown in FIG. 7, the amounts of yellow and magenta, which are necessary for reproducing red, can be increased by increasing the red adjusting coefficient $\alpha_R$ under the condition that the sum of the coefficients in each row in the equation (4) is 0.

As seen from the graph, the change quantity of the red of the original image is the largest, and those of yellow and magenta are each half of that of the red. No change is made in green, blue and cyan. In other words, the color adjustment is possible in the region within 180° with respect to red. Cyan as the complementary color of red is not influenced by the adjustment. Therefore, only the density of an intended color can be adjusted.

The same thing is true for intensifying the other colors, green and blue.

Embodiment 2

A basic arrangement of a color adjusting apparatus according to the second embodiment is the same as that of the apparatus of the first embodiment, and is as shown in FIG. 1. The second embodiment is featured by a circuitry to prevent the complementary color of a color to be adjusted from changing.

In FIG. 1, the circuits of the second embodiment which are the same as those of the first embodiment are: basic matrix masking circuit 101, adder circuit 102, color check output circuit 103, controller 106, and console 107. The color adjusting masking circuit 104 and the color adjusting coefficient circuit 105 are partially different from those of the first embodiment.

Accordingly, description of the second embodiment will be given mainly on the circuits different from those in the first embodiment.

Figure 14:
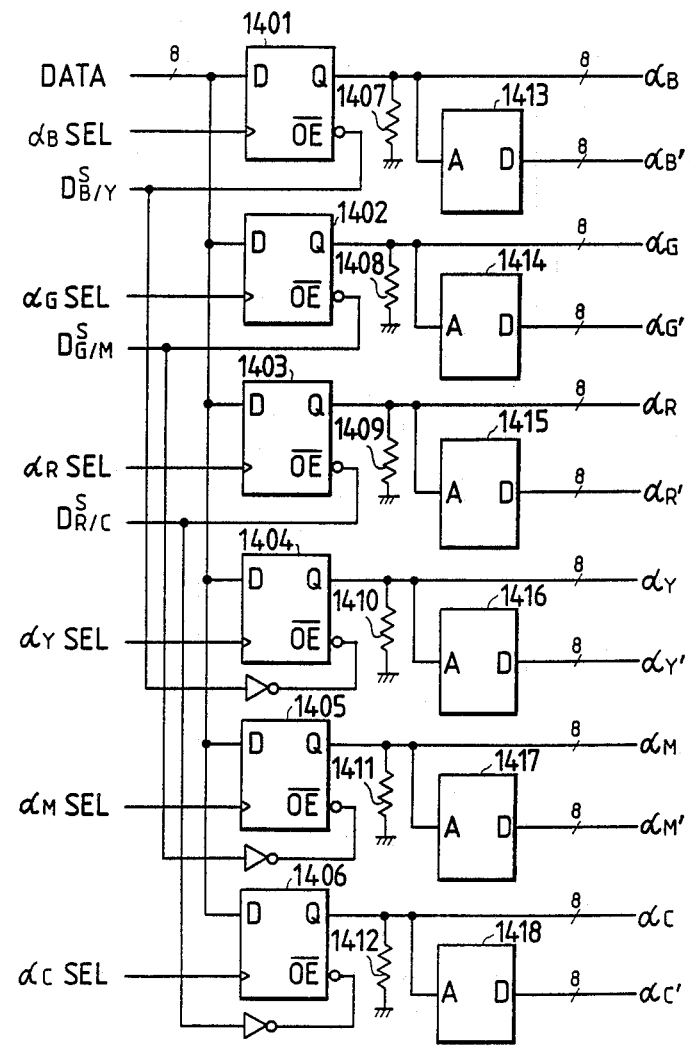
FIG. 14 is a block diagram of a color adjusting coefficient circuit in a second embodiment of a color adjusting apparatus according to the present invention.

FIG. 14 shows a circuit diagram of a color adjusting coefficients circuit according to the second embodiment of the present invention.

The circuit is made up of latches 1401 to 1406, pull-down resistors 1407 to 1412, and memory components 1413 to 1418. These latches receive at the data terminal D, through the controller containing a microcomputer. Under this condition, the latches successively receive at other terminals select signals $\alpha_B$SEL, $\alpha_G$SEL, $\alpha_R$SEL, $\alpha_Y$SEL, $\alpha_M$SEL and $\alpha_C$SEL. As a result, the color adjusting coefficients $\alpha_B$, $\alpha_G$, $\alpha_R$, $\alpha_Y$, $\alpha_M$ and $\alpha_C$ are set in accordance with the color adjusting quantities.

Then, sign bits $\overline{D^S}_{B/Y}$, $\overline{D^S}_{G/M}$ and $\overline{D^S}_{R/C}$ of the output signals $D_{B/Y}$, $D_{G/M}$ and $D_{R/C}$ of the color check output circuit, and their inverted sign bits $D^S_{B/Y}$, $D^S_{G/M}$ and $D^S_{R/C}$ are applied to the output ready input terminals $\overline{OE}$ of the latches 1401 to 1406. The coefficients $\alpha_B$, $\alpha_B'$, $\alpha_G$, $\alpha_G'$, $\alpha_R$, $\alpha_R'$, $\alpha_Y$, $\alpha_Y'$, $\alpha_M$, $\alpha_M'$, $\alpha_C$ and $\alpha_C'$ are zeroed, through resistors 1407 to 1412 when the equations (9) holds.

The coefficients $\alpha B$, $\alpha G$, $\alpha R$, $\alpha Y$, $\alpha M$ and $\alpha C$ are inputted to the address terminals of memory components 1413 to 1418. Look-up tables corresponding to the operation $a_i' = m_i a_i$ (i=B, G, R, Y, M and C) are prestored in the memory components 1413 to 1418. The memory components produce coefficients $\alpha_B'$ to $\alpha_C'$ at the data output terminals.

Figure 15:
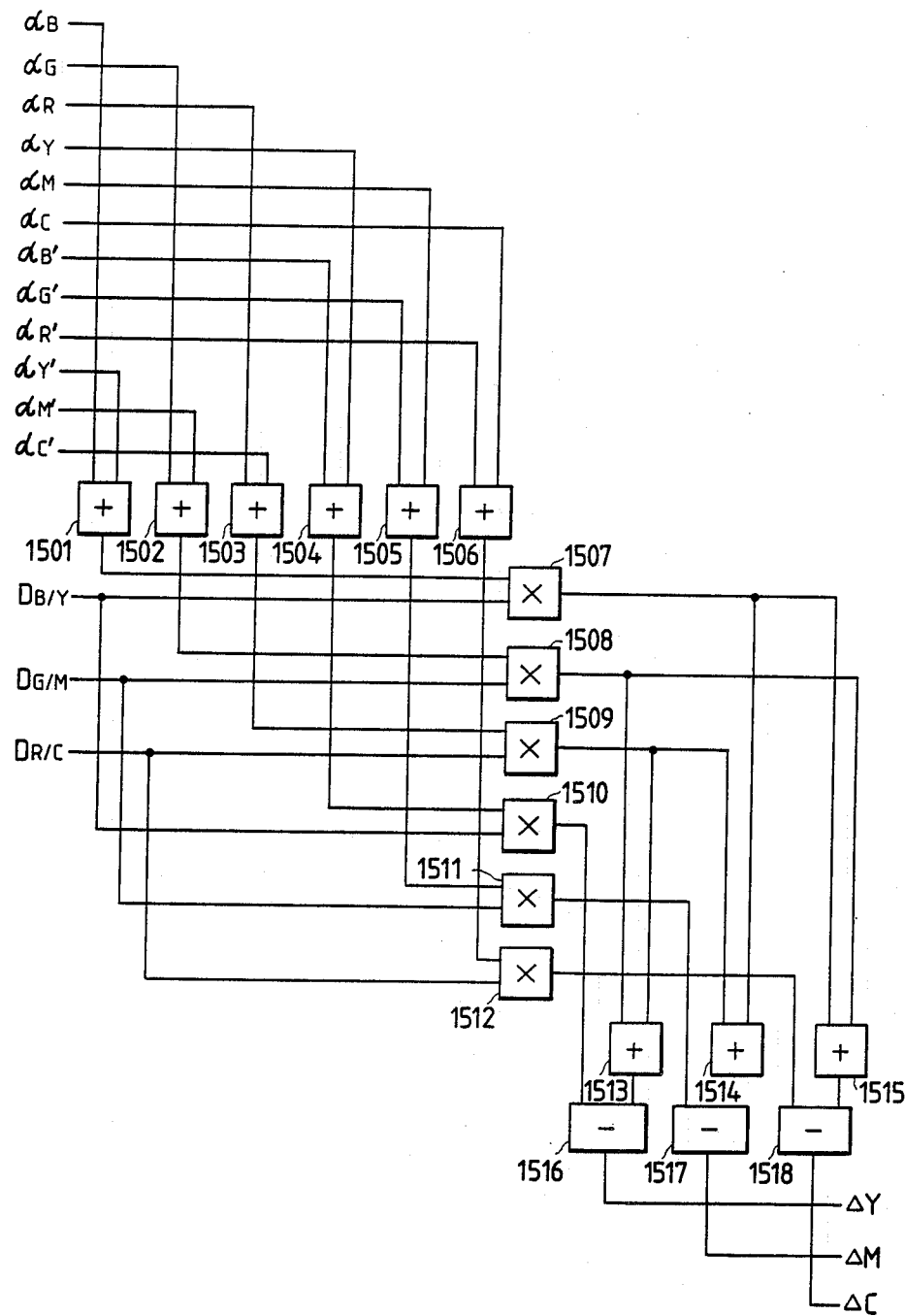
FIG. 15 is a block diagram of a color adjusting masking circuit in the second embodiment.

FIG. 15 is a circuit diagram of the color adjusting masking circuit.

The color check output signals $D_{B/Y}$, $D_{G/M}$, and $D_{R/C}$ from the color check output circuit 103, and the color adjusting coefficients $\alpha_B$, $\alpha_G$, $\alpha_R$, $\alpha_Y$, $\alpha_M$ and $\alpha_C$, $\alpha_B'$, $\alpha_G'$, $\alpha_R'$, $\alpha_Y'$, $\alpha_M'$ and $\alpha_C'$ from the color adjusting coefficients circuit 105, are applied to the color adjusting masking circuit. In the circuit, adders 1501 to 1506 produce the coefficients in the matrix (8)', $\alpha_B + \alpha_Y'$, $\alpha_G + \alpha_M'$, $\alpha_R + \alpha_C'$, $\alpha_B' + \alpha_Y$, $\alpha_G' + \alpha_M$, and $\alpha_R' + \alpha_C$. These coefficients are multiplied by the color check output signals $D_{B/Y}$, $D_{G/M}$ and $D_{R/C}$ by means of multipliers 1507 to 1512, to generate $(\alpha_B + \alpha_Y')D_{B/Y}$, $(\alpha_G + \alpha_M')D_{G/M}$, $(\alpha_R + \alpha_C')D_{R/C}$, $(\alpha_B' + \alpha_Y)D_{B/Y}$, $(\alpha_G' + \alpha_M)D_{G/M}$, and $(\alpha_R' + \alpha_C)D_{R/C}$. Those signals are applied to circuitry including adders 1513 to 1515 and subtractors 1516 to 1518, thereby to generate color adjusting quantities $\Delta C$, $\Delta M$, $\Delta Y$.

The color adjusting coefficients $\alpha_B$ to $\alpha_C$ are generally fractions between $-1.0$ and $1.0$. Therefore, the figure matching must be made in a manner that these coefficients are multiplied by an appropriate power of 2 into integers, these integers are inputted to the latches 1401 to 1406 in the color adjusting coefficients cifcuit shown in FIG. 14, and the lower order bits of of the multipliers 1507 to 1512 shown in FIG. 15 are discarded.

In the second embodiment, the individual color adjusting masking circuit 104 is provided, but if required, it may be contained in the basic matrix masking circuit 101.

For example, this can be realized in the following way. The memory components for the tables 201 to 209, and 213 to 221 in FIG. 2 are constructed with reprogrammable memory components (RAMs). The sign bit signals outputted from the color check output circuit shown in FIG. 3 are additionally applied to the address lines of the RAMs. The RAMs prestore a total of 8 types of tables of three color combinations, blue and yell, green and magenta, and red and cyan, as shown in Table 4. In the table, a single color symbol in each entry on the color combination row indicates that only the color of the color symbol is adjusted.

TABLE 4

|     | 1 | 2 | 3 | 4 | 5 | 6 | 7 | 8 |
|-----|---|---|---|---|---|---|---|---|
| B/Y | Y | Y | Y | Y | B | B | B | B |
| G/M | M | M | G | G | M | M | G | G |
| R/C | C | R | C | R | C | R | C | R |

The second embodiment has been described by using a color hard copying machine, such as a color laser zerography, color thermal printer, and color ink jet printer If necessary, the present invention is applicable for an apparatus using films and printing papers, such as a plate-making color scanner and a laser scan color camera.

TABLE 5

| | | | | Color change quantity (when red is intensified $\alpha_R = 0.1$ $\alpha_R' = 0.1$ Other coefficients = 0 | | | Color change quantity (when green is intensified) $\alpha_G = 0.1$ $\alpha_G' = 0.1$ Other coefficients = 0 | | | Color change quantity (when blue is intensified) $\alpha_B = 0.1$ $\alpha_B' = 0.1$ Other coefficients = 0 | | |
|---|---|---|---|---|---|---|---|---|---|---|---|---|
| Colors on original | Input Density | | | | | | | | | | | |
| | B | G | R | $\Delta Y$ | $\Delta M$ | $\Delta C$ | $\Delta Y$ | $\Delta M$ | $\Delta C$ | $\Delta Y$ | $\Delta M$ | $\Delta C$ |
| Blue | 50 | 200 | 200 | 0 | 0 | 0 | 0 | 0 | 0 | $-15$ | 30 | 30 |
| Cyan | 50 | 50 | 200 | 0 | 0 | 0 | 15 | $-7.5$ | 15 | $-7.5$ | 15 | 15 |
| Green | 200 | 50 | 200 | 0 | 0 | 0 | 30 | $-15$ | 30 | 0 | 0 | 0 |
| Yellow | 200 | 50 | 50 | 15 | 15 | $-7.5$ | 15 | $-7.5$ | 15 | 0 | 0 | 0 |
| Red | 200 | 200 | 50 | 30 | 30 | $-15$ | 0 | 0 | 0 | 0 | 0 | 0 |
| Magenta | 50 | 200 | 50 | 15 | 15 | $-7.5$ | 0 | 0 | 0 | $-7.5$ | 15 | 15 |
| Gray | 150 | 150 | 150 | 0 | 0 | 0 | 0 | 0 | 0 | 0 | 0 | 0 |

| | Color change quantity (when yellow is intensified) $\alpha_Y = 0.1$ $\alpha_Y' = 0.05$ Other coefficients = 0 | | | Color change quantity (when magenta is intensified) $\alpha_M = 0.1$ $\alpha_M' = 0.05$ Other coefficients = 0 | | | Color change quantity (when cyan is intensified) $\alpha_C = 0.1$ $\alpha_C' = 0.05$ Other coefficients = 0 | | |
|---|---|---|---|---|---|---|---|---|---|
| Colors on original | $\Delta Y$ | $\Delta M$ | $\Delta C$ | $\Delta Y$ | $\Delta M$ | $\Delta C$ | $\Delta Y$ | $\Delta M$ | $\Delta C$ |
| Blue | 0 | 0 | 0 | $-7.5$ | 15 | $-7.5$ | $-7.5$ | $-7.5$ | 15 |

TABLE 5-continued

| | | | | | | | | | |
|---|---|---|---|---|---|---|---|---|---|
| Cyan | 0 | 0 | 0 | 0 | 0 | 0 | −15 | −15 | 30 |
| Green | 15 | −7.5 | −7.5 | 0 | 0 | 0 | −7.5 | −7.5 | 15 |
| Yellow | 30 | −15 | −15 | 0 | 0 | 0 | 0 | 0 | 0 |
| Red | 15 | −7.5 | −7.5 | −7.5 | 15 | −7.5 | 0 | 0 | 0 |
| Magenta | 0 | 0 | 0 | −15 | 30 | −15 | 0 | 0 | 0 |
| Gray | 0 | 0 | 0 | 0 | 0 | 0 | 0 | 0 | 0 |

A color adjusting region within which the color adjustment is effective, and a degree of color adjustment or color change quantity in the color adjustments, which are performed in the present embodiment, will be described with reference to Table 5. The input densities are expressed in terms of converted values between 0 to 255.

Figure 16:
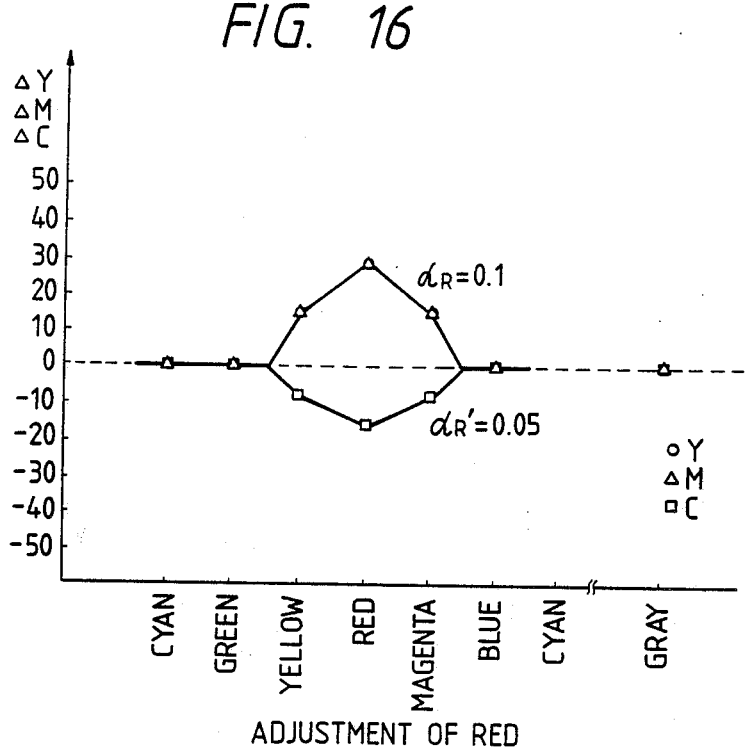
FIGS. 16 through 21 are graphs showing variations of a yellow signal, magenta signal, and cyan signal when red, green, blue, yellow, magenta, and cyan are adjusted in the second embodiment.
Figure 17:
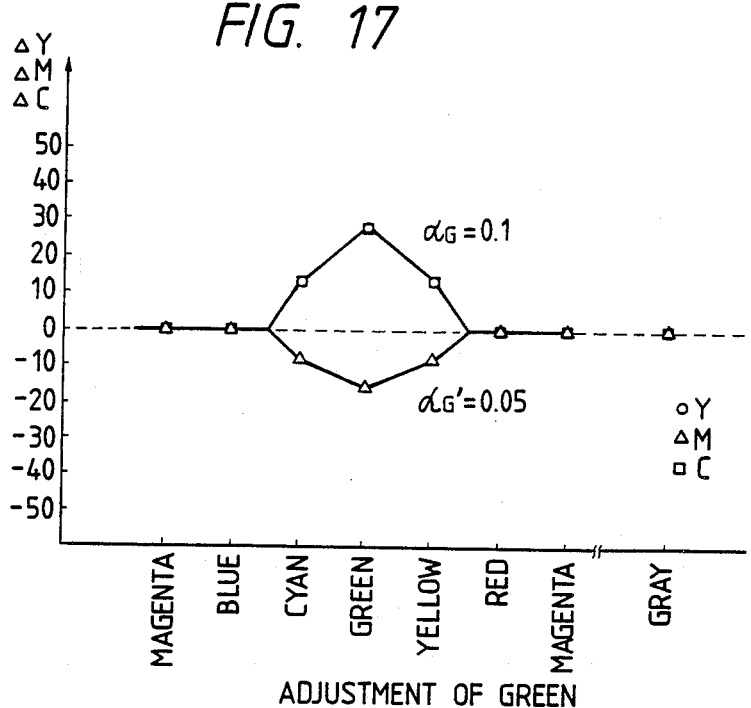
Figure 18:
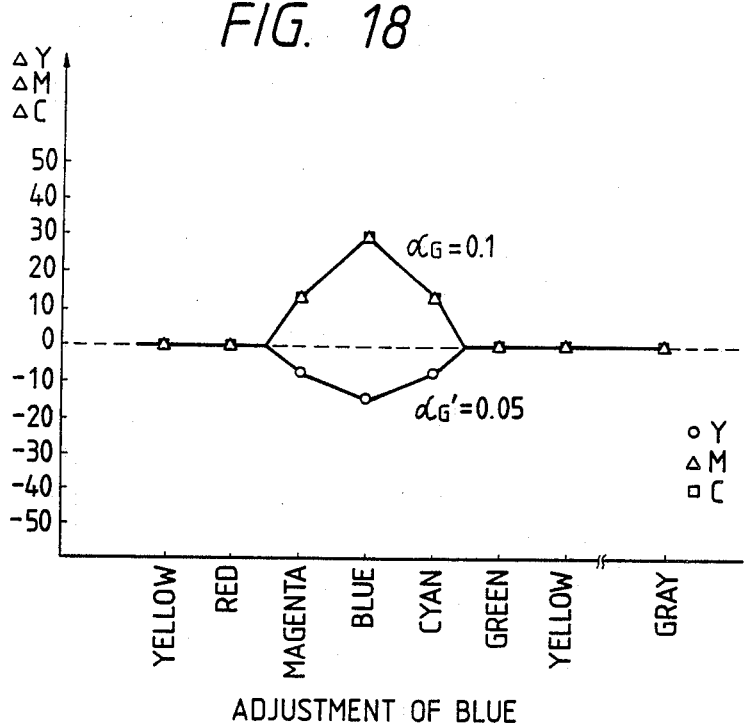
Figure 19:
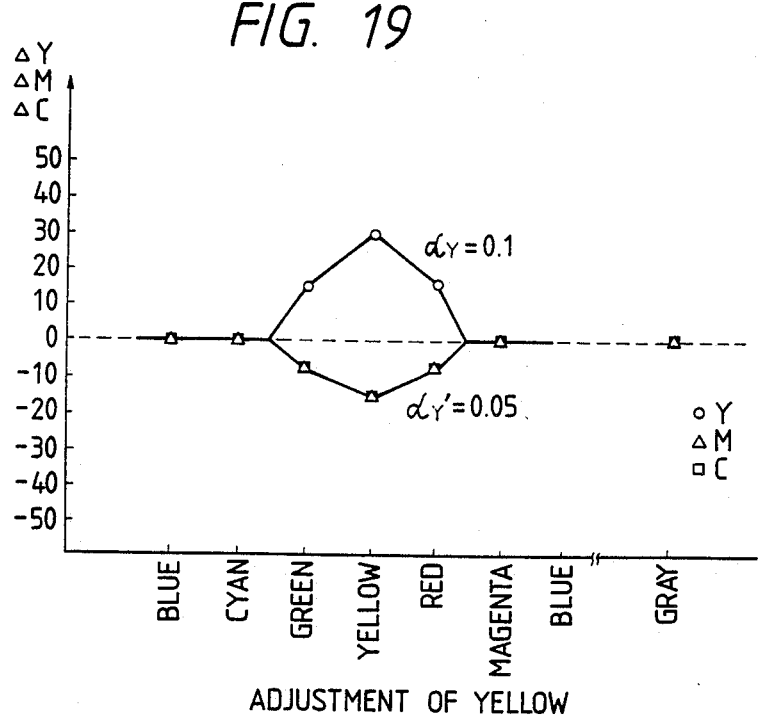
Figure 20:
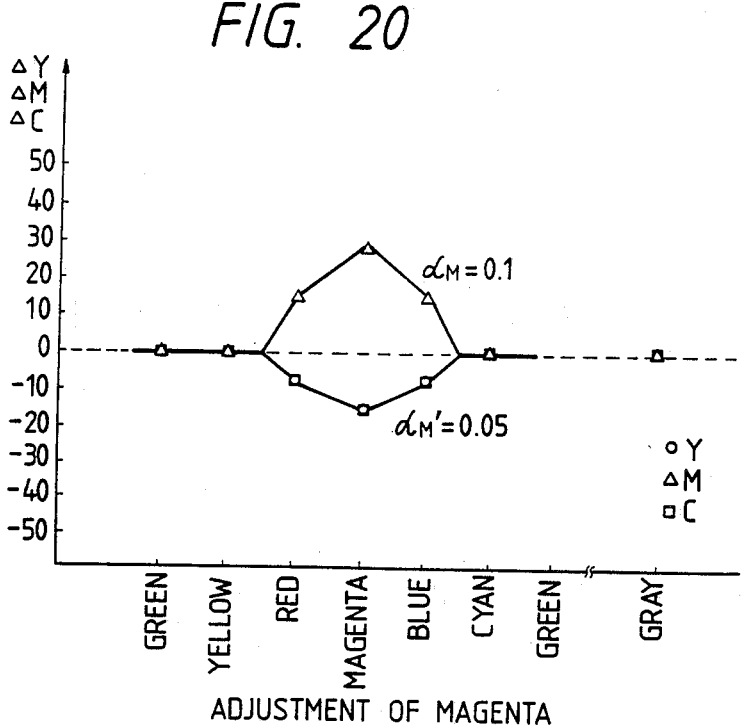
Figure 21:
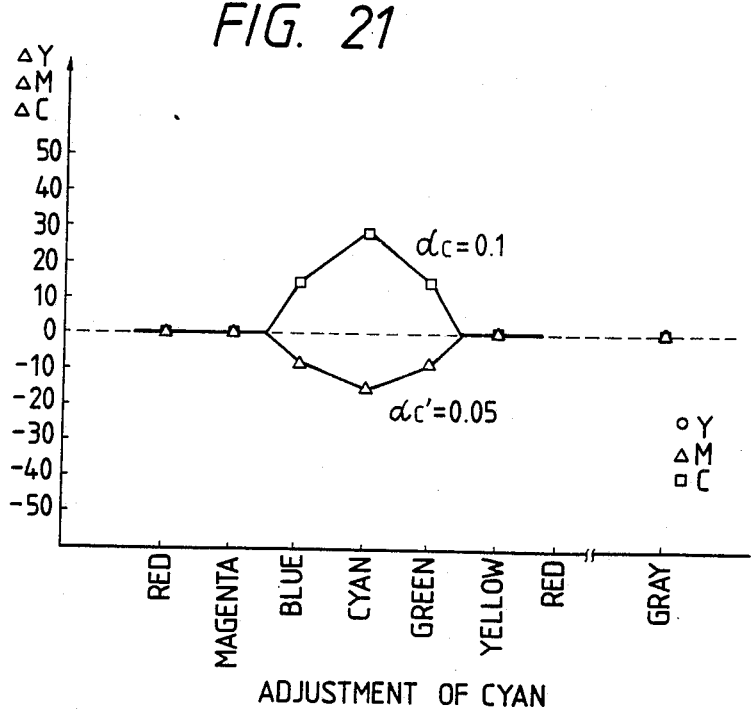

The change quantities of red, green, blue, yellow, magenta, and cyan due to the color adjustment shown in Table 5 are graphically represented as shown in FIGS. 16 to 22. A graph of FIG. 16 is for a case that red is intensified when $\alpha_R=0.1$ and $\alpha_R'=0.05$; a graph of FIG. 17 for a case that green is intensified when $\alpha_G=0.1$ and $\alpha_G'=0.05$; a graph of FIG. 18 for a case that blue is intensified when $\alpha_B=0.1$ and $\alpha_B'=0.05$; a graph of FIG. 19 for a case that yellow is intensified when $\alpha_Y=0.1$ and $\alpha_Y'=0.05$; a graph of FIG. 20 for a case that magenta is intensified when $\alpha_M=0.1$ and $\alpha_M'=0.05$; and a graph of FIG. 21 for a case that cyan is intensified when $\alpha_C=0.1$ and $\alpha_C'=0.05$.

Figure 22:
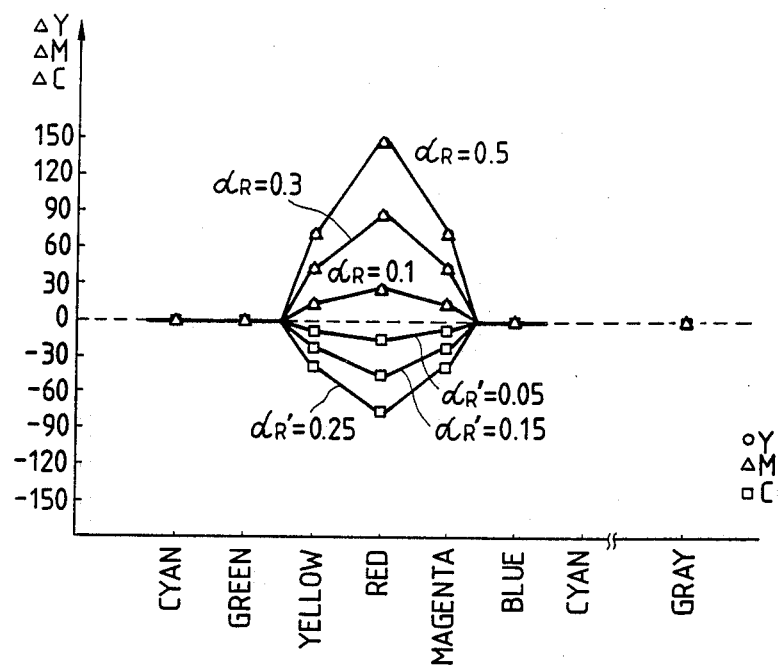
FIG. 22 is a graph showing a variation of the red after it is adjusted against several different red color adjusting coefficients in the second embodiment.

The change quantity of red varies as shown in FIG. 22 against 0.1, 0.3 and 0.5 of the red adjusting coefficient $\alpha_R$ and 0.05, 0.15, and 0.25 of the $\alpha_R'$.

In the present embodiment, when red can be intensified as shown in FIG. 16, the amounts of yellow and magenta, which are necessary for reproducing red, can be increased and the amount of unnecessary cyan can be reduced, by increasing the red adjusting coefficient $\alpha_R$ and $\alpha_R'$ under the condition that the sum of the coefficients in each row in the equation (8)' is 0.

As seen from the graph, the change quantity of the red of the original image is the largest, and those of yellow and magenta are each half of that of the red. No change is made in green, blue and cyan. In other words, the color adjustment is possible in the region within 180° with respect to red. Cyan as the complementary color of red is not influenced by the color adjustment. Therefore, only the density of an intended color can be adjusted.

The same thing is true for intensifying the other colors, green and blue.

In the above-mentioned embodiments, the input colors are B, G and R, but the colors Y, M and C may be used for the input colors, if required.

As seen from the foregoing description, in the matrix masking for the color correction and color adjustments, the color adjusting coefficients for the respective colors are added to the color corrections signals in the coefficient matrix. With this, an image color on an original can be satisfactorily adjusted through the adjustments of only the colors resulting from the color separation, i.e., blue, green, red, yellow, magenta, and cyan.

Further, it is noted that the sum of the color adjusting coefficients in each row in the matrix is 0. By this feature, a gray level in the original image can be maintained even after the color adjustments. Additionally, the chroma check is made in the color adjustment. This feature prevents the color adjustments from influencing the complementary colors. Only the intended color can be adjusted independently of other colors. Accordingly, the color adjustment is easy and does not require any professional skill.

What is claimed is:

1. In a color image forming apparatus in which output signals of yellow, magenta and cyan are formed from color signals of blue, green, and red that are obtained by separating an image on an original, in forming the output signals, a matrix masking is performed in which said respective color signals are multiplied by color correction coefficients in a coefficient matrix, thereby to correct irregular absorption of color materials, color adjusting coefficients are added to said correction coefficients corresponding to the respective colors in said coefficients matrix, and coefficients so as to zero the sum of said color adjusting coefficients in each row of said matrix are subtracted from said color signals, thereby to keep a gray level unchanged, and the color materials are outputted on a recording medium in accordance with said output signals, a method for adjusting colors comprising the steps of:

adjusting a red color by obtaining a yellow signal and a magenta signal which are color adjusted through a multiplication of said blue and green color signals by a red color adjusting coefficient;

adjusting a green color by obtaining a yellow signal and a cyan signal which are color adjusted through a multiplication of said blue and red color signals by a green color adjusting coefficient;

adjusting a blue color by obtaining a magenta signal and a cyan signal which are color adjusted through a multiplication of said green and red color signals by a blue color adjusting coefficient;

adjusting a yellow color by obtaining a yellow signal which is color adjusted through a multiplication of said blue color signals by yellow color adjusting coefficients;

adjusting a magenta color by obtaining a magenta signal which is color adjusted through a multiplication of said green color signals by magenta color adjusting coefficients; and adjusting a cyan color by obtaining a cyan signal color which is adjusted through a multiplication of said red color signals by cyan color adjusting coefficients.

2. In a color image forming apparatus in which output signals of yellow, magenta and cyan are formed from color signals of blue, green, and red that are obtained by separating an image on an original, in forming the output signals, a matrix masking is performed in which said respective color signals are multiplied by color correction coefficients in a coefficient matrix, thereby to correct irregular absorption of color materials, color adjusting coefficients are added to said correction coefficients corresponding to the respective colors in said coefficients matrix, and coefficients so as to zero the sum of said color adjusting coefficients in each row of said matrix are subtracted from said color signals, thereby to keep a gray level unchanged, and the color materials are outputted on a recording medium in accordance with said output signals, a method for adjusting colors comprising the steps of:

adjusting a red color by obtaining a yellow signal and a magenta signal, which are for color adjustment and are obtained through a multiplication of said blue and green color signals by red color adjusting coefficients, and by obtaining a cyan signal which is for color adjustment and is obtained through a multiplication of said blue and green color signals by a color adjusting coefficient to reduce a color density of the complementary color of red;

adjusting a green color by obtaining a yellow signal and a cyan signal, which are for color adjustment and are obtained through a multiplication of said blue and red color signals by green color adjusting coefficients, and by obtaining a magenta signal which is for color adjustment and is obtained through a multiplication of said blue and red color signals by a color adjusting coefficient to reduce a color density of the complementary color of green;

adjusting a blue color by obtaining a magenta signal and a cyan signal, which are for color adjustment and are obtained through a multiplication of said green and red color signals by blue color adjusting coefficients, and by obtaining a yellow signal which is for color adjustment and is obtained through a multiplication of said green and red color signals by a color adjusting coefficient to reduce a color density of the complementary color of blue;

adjusting a yellow color by obtaining a yellow signal which is color adjusted through a multiplication of said blue signal by a yellow color adjusting coefficient and by obtaining a magenta signal and a cyan signal color adjusted through a multiplication of said blue color signal by a color adjusting coefficient to reduce a color density of the complementary color of blue;

adjusting a magenta color by obtaining a magenta signal which is color adjusted through a multiplication of said green signal by a magenta color adjusting coefficient and by obtaining a yellow signal and a cyan signal color adjusted through a multiplication of said green color signal by a color adjusting coefficient to reduce a color density of the complementary color of magenta; and adjusting a cyan color by obtaining a cyan signal which is color adjusted through a multiplication of said red signal by a cyan color adjusting coefficient and by obtaining a yellow signal and a magenta signal adjusted through a multiplication of said red color signal by a color adjusting coefficient to reduce a color density of the complementary color of cyan.

3. A color image forming apparatus which forms output signals Y, M and C of yellow, magenta and cyan from color signals B, G and R of blue, green, and red that are obtained by separating an image on an original, and outputs color materials on a recording medium in accordance with said output signals, said color image forming apparatus comprising:

basic matrix masking means for correcting irregular absorption of said color materials by a matrix masking process in which said color signals B, G and R are multiplied by color correction coefficients;

color check output means for producing color check signals $D_{B/Y}$, $D_{G/M}$ and $D_{R/C}$ by solving the following equations $$D_{B/Y} = -(l_{B1}+l_{B2})B + l_{B1}G + l_{B2}R$$

$$D_{G/M} = l_{G1}B - (l_{G1}+l_{G2})G + l_{G2}R$$

$$D_{R/C} = l_{R1}B + l_{R2}G - (l_{R1}+l_{R2})R$$

where $l_{B1}$, $l_{B2}$, $l_{G1}$, $l_{G2}$, $l_{R1}$ and $l_{R2}$ are constants;

color adjustment setting means for setting a desired color and a degree of color adjustment;

color adjusting coefficient holding means for holding a color adjusting coefficient in accordance with the setting by said color adjustment setting means, and for correcting said held color adjusting coefficient, in accordance with the check results by said color check output means, so as to satisfy the following conditions, when $D_{B/Y} < 0$, $\alpha_B = 0$, when $D_{G/M} < 0$, $\alpha_G = 0$, when $D_{R/C} < 0$, $\alpha_R = 0$, when $D_{B/Y} > 0$, $\alpha_Y = 0$, when $D_{G/M} > 0$, $\alpha_M = 0$, when $D_{R/C} > 0$, $\alpha_C = 0$;

color adjusting masking means for obtaining color adjusting signals $\Delta Y$, $\Delta M$, $\Delta C$ by solving the following matrix $$\begin{bmatrix} \Delta Y \\ \Delta M \\ \Delta C \end{bmatrix} = \begin{bmatrix} -\alpha_Y & \alpha_G & \alpha_R \\ \alpha_B & -\alpha_M & \alpha_R \\ \alpha_B & \alpha_G & -\alpha_C \end{bmatrix} \begin{bmatrix} D_{B/Y} \\ D_{G/M} \\ D_{R/C} \end{bmatrix}$$

where $D_{B/Y}$, $D_{G/M}$ and $D_{R/C}$: output signals of said color check output means, and $\alpha_B$, $\alpha_G$, $\alpha_R$, $\alpha_Y$, $\alpha_M$ and $\alpha_C$: color adjusting coefficients outputted from said color adjusting coefficient holding means; and adder means for adding together the output signal of said basic matrix masking means and the output signal of said color adjusting masking means, to output a color adjusted color signal.

4. A color image forming apparatus which forms output signals Y, M and C of yellow, magenta and cyan from color signals B, G and R of blue, green, and red that are obtained by separating an image on an original, and outputs color materials on a recording medium in accordance with said output signals, said color image forming apparatus comprising:

basic matrix masking means for correcting irregular absorption of said color materials by a matrix masking process in which said color signals B, G and R are multiplied by color correction coefficients;

color check output means for producing color check signals $D_{B/Y}$, $D_{G/M}$ and $D_{R/C}$ by solving the following equations $$D_{B/Y} = -(l_{B1}+l_{B2})B + l_{B1}G + l_{B2}R$$

$$D_{G/M} = l_{G1}B - (l_{G1}+l_{G2})G + l_{G2}R$$

$$D_{R/C} = l_{R1}B + l_{R2}G - (l_{R1}+l_{R2})R$$

where $l_{B1}$, $l_{B2}$, $l_{G1}$, $l_{G2}$, $l_{R1}$ and $l_{R2}$ are constants;

color adjustment setting means for setting a desired color and a degree of color adjustment;

color adjusting coefficient means including a holding means for holding color adjusting coefficients $\alpha_B$, $\alpha_G$, $\alpha_R$, $\alpha_Y$, $\alpha_M$, $\alpha_C$ for adjusting the colors of blue, green, red, yellow, magenta, and cyan in accordance with the setting of said color adjustment setting means, means for generating color adjusting coefficients $\alpha_B'$, $\alpha_G'$, $\alpha_R'$, $\alpha_Y'$, $\alpha_M'$, $\alpha_C'$ for adjusting colors to be adjusted by adding and subtracting the complementary colors of said adjusted colors to and from said color adjusting coefficients $\alpha_B$, $\alpha_G$, $\alpha_R$, $\alpha_Y$, $\alpha_M$, $\alpha_C$, and means for correcting said held color adjusting coefficient, in accordance with the check results by said color check output means, so as to satisfy the following conditions, when $D_{B/Y}<0$, $\alpha_B=0$, $\alpha_B'=0$, when $D_{G/M}<0$, $\alpha_G=0$, $\alpha_G'=0$, when $D_{R/C}<0$, $\alpha_R=0$, $\alpha_R'=0$, when $D_{B/Y}>0$, $\alpha_Y=0$, $\alpha_Y'=0$, when $D_{G/M}>0$, $\alpha_M=0$, $\alpha_M'=0$, when $D_{R/C}>0$, $\alpha_C=0$, $\alpha_C'=0$;

color adjusting masking means for obtaining color adjusting signals $\Delta Y$, $\Delta M$, $\Delta C$ by solving the following matrix $$\begin{bmatrix} \Delta Y \\ \Delta M \\ \Delta C \end{bmatrix} = \begin{bmatrix} -\alpha_B' - \alpha_Y & \alpha_G + \alpha_M' & \alpha_R + \alpha_C' \\ \alpha_B + \alpha_Y' & -\alpha_G' - \alpha_M & \alpha_R + \alpha_C' \\ \alpha_B + \alpha_Y' & \alpha_G + \alpha_M' & -\alpha_R' - \alpha_C \end{bmatrix} \begin{bmatrix} D_{B/Y} \\ D_{G/M} \\ D_{R/C} \end{bmatrix}$$

where $D_{B/Y}$, $D_{G/M}$ and $D_{R/C}$: output signals of said color check output means, and $\alpha_B$, $\alpha_G$, $\alpha_R$, $\alpha_Y$, $\alpha_M$, $\alpha_C$, and $\alpha_B'$, $\alpha_G'$, $\alpha_R'$, $\alpha_Y'$, $\alpha_M'$ and $\alpha_C'$: color adjusting coefficients outputted from said color adjusting coefficient means; and adder means for adding together the output signal of said basic matrix masking means and the output signal of said color adjusting masking means, to output a color adjusted color signal.

* * * * *